(12) United States Patent  (10) Patent No.: US 7,551,319 B2
Ogasawara  (45) Date of Patent: Jun. 23, 2009

(54) PRINTER DEVICE, PRINTING METHOD, PRINTING PROGRAM, AND RECORDING MEDIUM

(75) Inventor: Naruhiko Ogasawara, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 677 days.

(21) Appl. No.: 11/171,349

(22) Filed: Jul. 1, 2005

(65) Prior Publication Data
US 2006/0001897 A1 Jan. 5, 2006

(30) Foreign Application Priority Data
Jul. 2, 2004 (JP) ............................. 2004-196801

(51) Int. Cl.
H04N 1/40 (2006.01)
(52) U.S. Cl. .................. 358/1.9; 358/1.15; 358/468
(58) Field of Classification Search ................. 358/1.9, 358/2.1, 468, 1.15–1.16, 437
See application file for complete search history.

(56) References Cited

U.S. PATENT DOCUMENTS

| 5,917,913 | A  | * | 6/1999 | Wang | 705/67 |
| 6,175,922 | B1 | * | 1/2001 | Wang | 713/182 |
| 7,180,621 | B2 | * | 2/2007 | Clough et al. | 358/1.15 |
| 2003/0078965 | A1 | * | 4/2003 | Cocotis et al. | 709/203 |

FOREIGN PATENT DOCUMENTS

| JP | 2002-373073 | 12/2002 |
| JP | 2003-276281 | 9/2003 |
| JP | 2003-330668 | 11/2003 |
| JP | 2003-345581 | 12/2003 |

* cited by examiner

Primary Examiner—Thomas D Lee
Assistant Examiner—Stephen M Brinich
(74) Attorney, Agent, or Firm—Oblon, Spivak, McClelland, Maier & Neustadt, P.C.

(57) ABSTRACT

A printer device is provided that includes: an authenticating unit that performs user authentication; a determining unit that determines whether a print job is to be handled as a guest job that has limited authority to print and accumulate documents, based on predetermined information; and an executing unit that performs document printing and accumulation, based on the result of the determination by the determining unit.

8 Claims, 29 Drawing Sheets

| LOG-IN ID | PASSWORD | SCREEN NAME | PRINT | MANAGER? | NUMBER OF SHEETS USED THIS MONTH |
|---|---|---|---|---|---|
| Taro | dlvowlx | TARO YAMADA | ALLOWED | NO | 238 |
| Hanako | erpSuH7 | HANAKO SUZUKI | NOT ALLOWED | NO | 0 |
| Admin | 0x2aiuqw | MANAGER | ALLOWED | YES | 400 |
| Guest | ---- | ---- | ALLOWED | NO | 42 |

| ITEM | VALUE |
|---|---|
| OWNER ID | tarou |
| OWNER SCREEN NAME | TARO TANAKA |
| NUMBER OF PRINTED COPIES | 10 |
| NUMBER OF PAGES | 3 |
| TWO-SIDED | YES |
| STAPLING | UPPER RIGHT |
| DOCUMENT ACCUMULATION | YES |
| GUEST JOB? | NO |
| ... | ... |

| ITEM | VALUE |
|---|---|
| OWNER ID | tarou |
| OWNER SCREEN NAME | TARO TANAKA |
| NUMBER OF PRINTED COPIES | 10 |
| NUMBER OF PAGES | 3 |
| TWO-SIDE | YES |
| STAPLING | UPPER RIGHT |
| DOCUMENT ACCUMULATION | YES |
| GUEST JOB? | NO |
| ... | ... |
| PRINT RESULT | SUCCEEDED |
| TOTAL NUMBER OF PRINTED COPIES | 10 |
| TOTAL NUMBER OF PRINTED PAGES | 30 |
| NUMBER OF DISCARDED SHEETS DUE TO PAPER JAM | 2 |
| ... | ... |

FIG.6

```
<ESC>%-12345X@PJL  JOB              ← JOB START MARK
@PJL  SET  JOBNAME ="test.txt"
@PJL  SET  DATE = "2004/03/30"      ⎫ PRINT CONTROL
@PJL  SET  TIME = "13:03:19"        ⎬ INFORMATION  21
@PJL  SET  COPIES = 1               ⎭
@PJL  SET  QTY = 3
...
@PJL  ENTER  LANGUAGE = PCL         ⎫
...                    ＼            ⎬ IMAGE FORMATION
...              PDL IDENTIFIER     ⎭ INFORMATION  22
...
...
<ESC>%-12345X@PJL  EOJ              JOB END MARK
```

| ITEM | VALUE |
|---|---|
| IS GUEST JOB ALLOWED? | ALLOWED/NOT ALLOWED |
| ... | ... |

| ITEM | VALUE |
|---|---|
| OWNER ID | — |
| OWNER SCREEN NAME | — |
| NUMBER OF PRINTED COPIES | 3 |
| NUMBER OF PAGES | 7 |
| TWO-SIDED | NO |
| STAPLING | TWO ON THE LEFT |
| DOCUMENT ACCUMULATION | NO |
| GUEST JOB? | YES |
| ... | ... |

FIG.21

DOCUMENT PRINTING

SELECT DOCUMENT

| | USER ID | DATE | NUMBER OF COPIES |
|---|---|---|---|
| ALL DOCUMENTS | 00000010 | 04/28 13:55 | *** |
| CLASSIFIED DOCUMENTS | 00000009 | 04/28 13:55 | *** |
| TEST DOCUMENTS | 00000008 | 04/28 13:55 | *** |
| | 00000007 | 04/28 13:55 | *** |
| | 00000006 | 04/28 13:55 | *** |

1/2
△ PREVIOUS
▼ NEXT

END
DETAILS
PRINT CONTINUE — 271
DELETE

```
<ESC>%-12345X@PJL  JOB          ← JOB START MARK

@PJL  SET  JOBNAME ="test.txt"
@PJL  SET  DATE = "2004/03/30"
@PJL  SET  TIME = "13:03:19"              21
@PJL  SET  COPIES = 1                     PRINT
@PJL  SET  QTY = 3                        CONTROL
...                                       INFORMATION
@PJL  SET  USERNAME ="Taro"    } AUTHENTICATION
@PJL  SET  PASSWORD ="dlvowlx" } INFORMATION
@PJL  SET  GUEST = TRUE        ← GUEST JOB
...                              IDENTIFICATION
@PJL  ENTER  LANGUAGE = PCL      INFORMATION     22
                         \                       IMAGE
...                                              FORMATION
...                        PDL                   INFORMATION
...                        IDENTIFIER
...
<ESC>%-12345X@PJL  EOJ         ← JOB END MARK
```

| ITEM | VALUE |
| --- | --- |
| OWNER ID | Taro |
| OWNER SCREEN NAME | TARO YAMADA |
| NUMBER OF PRINTED COPIES | 3 |
| NUMBER OF PAGES | 7 |
| TWO-SIDED | NO |
| STAPLING | TWO ON THE LEFT |
| DOCUMENT ACCUMULATION | NO |
| GUEST JOB? | YES |
| ... | ... |

| LOG-IN ID | PASSWORD | SCREEN NAME | PRINT | MANAGER? | NUMBER OF SHEETS USED THIS MONTH |
|---|---|---|---|---|---|
| Taro | dlvowlx | TARO YAMADA | ALLOWED | NO | 238 |
| Hanako | erpSuH7 | HANAKO SUZUKI | ALLOWED | NO | 14 |
| Admin | 0x2aiuqw | MANAGER | NOT ALLOWED | YES | 0 |
| Guest | ---- | ---- | ALLOWED | NO | 42 → 59 |

| LOG-IN ID | PASSWORD | SCREEN NAME | PRINT | MANAGER? | NUMBER OF SHEETS USED THIS MONTH |
|---|---|---|---|---|---|
| Taro | dlvowlx | TARO YAMADA | ALLOWED | NO | 238 → 259 |
| Hanako | erpSuH7 | HANAKO SUZUKI | ALLOWED | NO | 14 |
| Admin | 0x2aiuqw | MANAGER | NOT ALLOWED | YES | 0 |
| Guest | ---- | ---- | ALLOWED | NO | 42 |

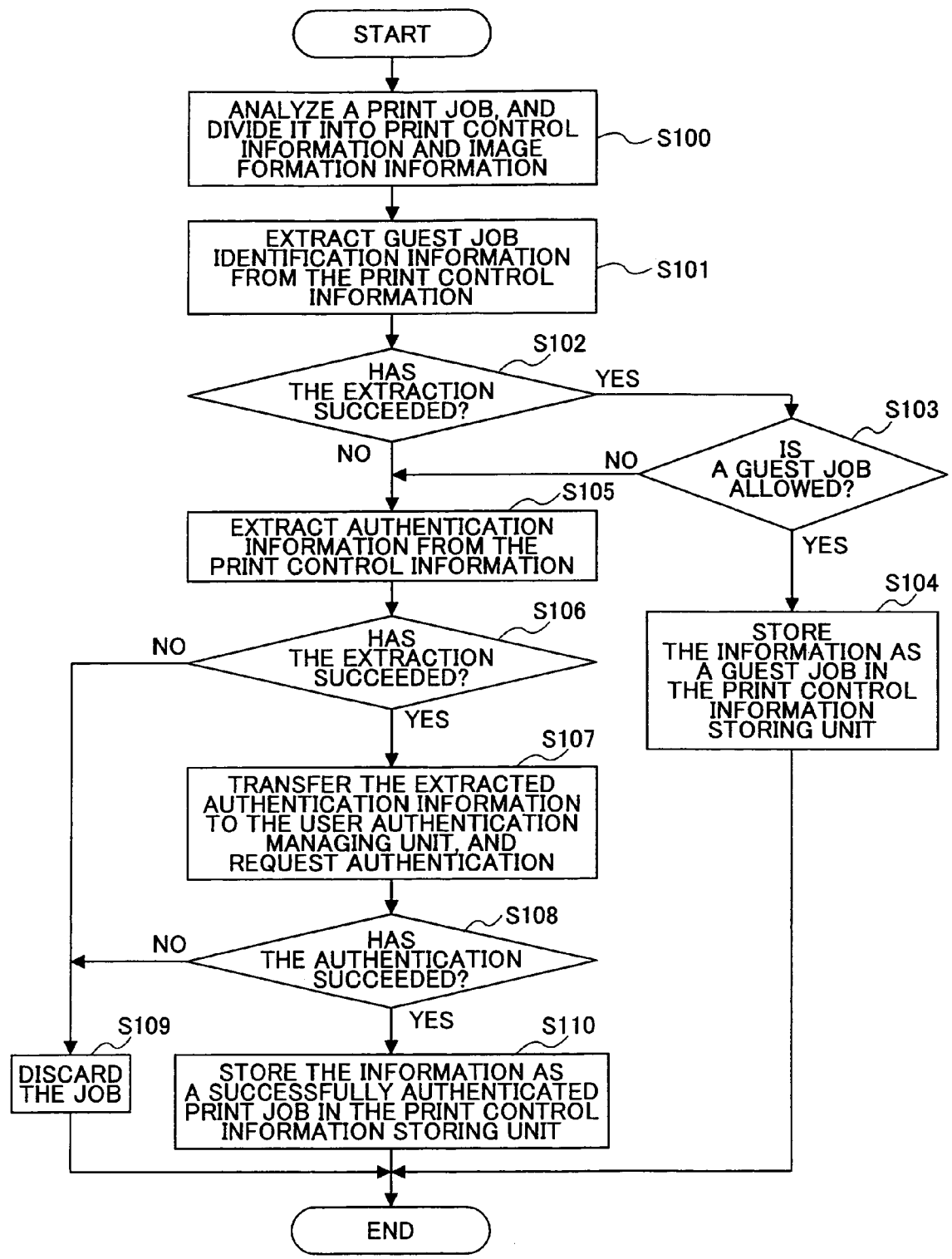

| ITEM | VALUE |
|---|---|
| IS PRINTING BY A GUEST ALLOWED? | YES/NO |
| I/FS TO BE REGARDED AS GUESTS | NO DESIGNATION/IEEE1284/IEEE1394/... |
| ... | ... |

FIG.30

| 143 | |
|---|---|
| ITEM | VALUE |
| IS PRINTING BY A GUEST ALLOWED? | YES/NO |
| DEVICES TO BE REGARDED AS GUESTS | NO DESIGNATION/192.168.○○.×.×/192.168.○△.□×/··· |
| ... | ... |

| ITEM | VALUE |
|---|---|
| IS PRINTING BY A GUEST ALLOWED? | YES/NO |
| PRINTER LANGUAGES TO BE REGARDED AS GUESTS | NO DESIGNATION/PCL / RPDL / ... |
| ... | ... |

PRINTER DEVICE, PRINTING METHOD, PRINTING PROGRAM, AND RECORDING MEDIUM

BACKGROUND OF THE INVENTION

1. Field of the Invention

The present invention relates to a printer device, a printing method, a printing program, and a recording medium.

2. Description of the Related Art

There is a demand for a system that allows certain users to use shared office equipment such as printers provided in an office, and charges each user or department according to the frequency of use.

To satisfy such a demand, a system that restricts users through the combination of a printer and software installed in a personal computer (hereinafter referred to simply as PC) has been provided (see Japanese Laid-Open Patent Application Nos. 2003-276281 and 2002-373073, for example).

As for the charging, a special accounting device or the like has been used.

However, the above conventional technique has the problem that the user restriction and the account management are not efficiently conducted.

So as to solve this problem, an authentication unit that authenticates office equipment such as printers is employed. Based on user authentication information or the like added to the print job, the authentication unit performs user authentication. A user restricting operation and an account managing operation may be efficiently performed in view of the user authentication and the authority of authenticated users.

When a PC generates a print job for a printer, a module called a printer driver that is provided by a printer vender is normally used. Therefore, the addition of user authentication information or the like to a print job is performed by a printer driver.

However, there are many cases where the modules for generating print jobs are produced by a system other than a printer vendor, such as CAD (Computer Aided Design) applications, direct print applications with PDF (Portable Document Format), or systems formed with mainframes. In such cases, it is not necessarily easy to add user authentication information or the like to a print job.

Therefore, with a conventional printer, a user restricting operation and an account managing operation cannot be efficiently performed for CAD applications, direct printing applications with PDF, and systems formed with mainframes.

SUMMARY OF THE INVENTION

A general object of the present invention is to provide a printer device, a printing method, a printing program, and a recording medium in which the above disadvantages are eliminated.

A more specific object of the present invention is to efficiently provide a user restricting service and an account managing service in accordance with various print jobs.

The above objects of the present invention are achieved by a printer device that includes: an authenticating unit that performs user authentication; a determining unit that determines whether a print job is to be handled as a guest job that has limited authority to print and accumulate documents, based on predetermined information; and an executing unit that performs document printing and accumulation, based on the result of the determination by the determining unit.

In accordance with the present invention, a user restricting service and an account managing service for various print jobs can be efficiently provided by the printer device that includes: an authenticating unit that performs user authentication; a determining unit that determines whether a print job is to be handled as a guest job that has limited authority to print and accumulate documents, based on predetermined information; and an executing unit that performs document printing and accumulation, based on the result of the determination by the determining unit.

The above objects of the present invention are also achieved by a printing method, a printing program, and a recording medium.

In accordance with the present invention, a user restricting service and an account managing service can be efficiently provided in accordance with various print jobs.

The above and other objects, features, and advantages of the present invention will become more apparent from the following detailed description taken in conjunction with the accompanying drawings.

BRIEF DESCRIPTION OF THE DRAWINGS

FIG. 3 shows an example of an address book;

FIG. 4 shows a first example of the information that is stored in the print control information storing unit;

FIG. 5 shows an example of the job history information that is stored in the job history storing unit;

FIG. 6 shows a first example of a guest job;

FIG. 7 shows a first example of the information that is stored in the NVRAM;

FIG. 8 shows a second example of the information that is stored in the print control information storing unit;

FIG. 21 illustrates a first example of an accumulated document select screen;

FIG. 23 shows a second example of a guest job;

FIG. 24 shows a third example of the information that is stored in the print control information storing unit;

FIG. 25 is a first schematic view of an address book;

FIG. 26 is a second schematic view of an address book;

FIG. 27 is a flowchart of a second example of a guest job setting operation;

FIG. 28 shows a second example of the information that is set in the NVRAM;

FIG. 30 shows a third example of the information that is set in the NVRAM;

FIG. 32 shows a fourth example of the information that is set in the NVRAM; and

DESCRIPTION OF THE PREFERRED EMBODIMENTS

The following is a description of embodiments of the present invention, with reference to the accompanying drawings.

First Embodiment

Figure 1:
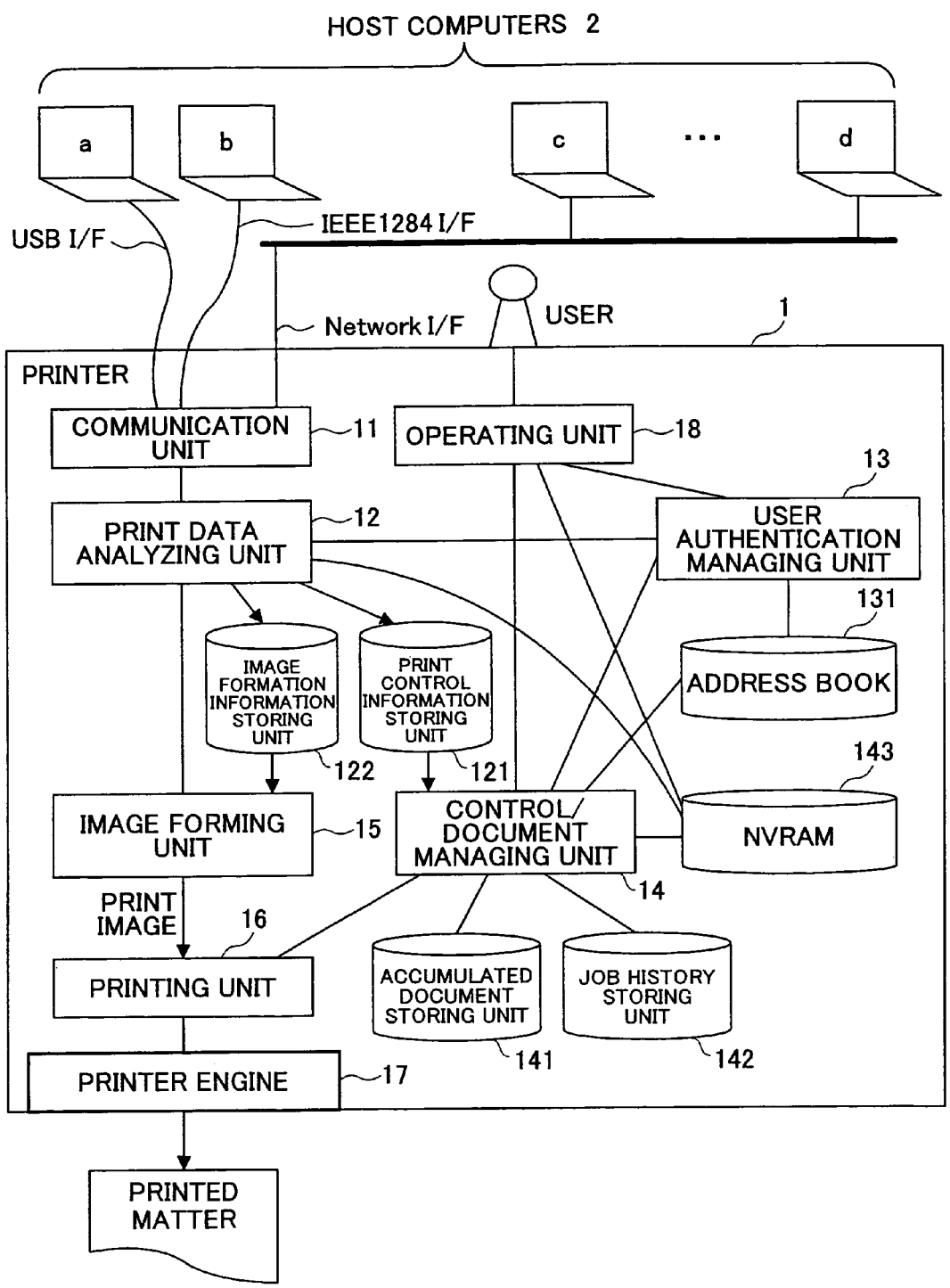
FIG. 1 illustrates the functional structure of a printer.

FIG. 1 illustrates the functional structure of a printer. As shown in FIG. 1, the printer 1 includes a communication unit 11, a print data analyzing unit 12, a user authentication managing unit 13, a control/document managing unit 14, an image forming unit 15, a printing unit 16, a printer engine 17, an operating unit 18, an image formation information storing unit 122, a print control information storing unit 121, an address book 131, an accumulated document storing unit 141, a job history storing unit 142, and a NVRAM 143.

The communication unit 11 controls the communication between the printer 1 and host computers 2. As shown in FIG. 1, the printer 1 is connected to the host computers 2 via a USB interface, an IEEE 1284 interface, a Network interface, and the likes. For example, a print job produced by a printer driver of the host computers 2 is received by the communication unit 11.

The print data analyzing unit 12 analyzes the data relating to printing operations such as a print job. For example, as a result of analyzing a print job, print control information 21 and image formation information 22 that will be described later are stored in the print control information storing unit 121 and the image formation information storing unit 122.

Figure 2:
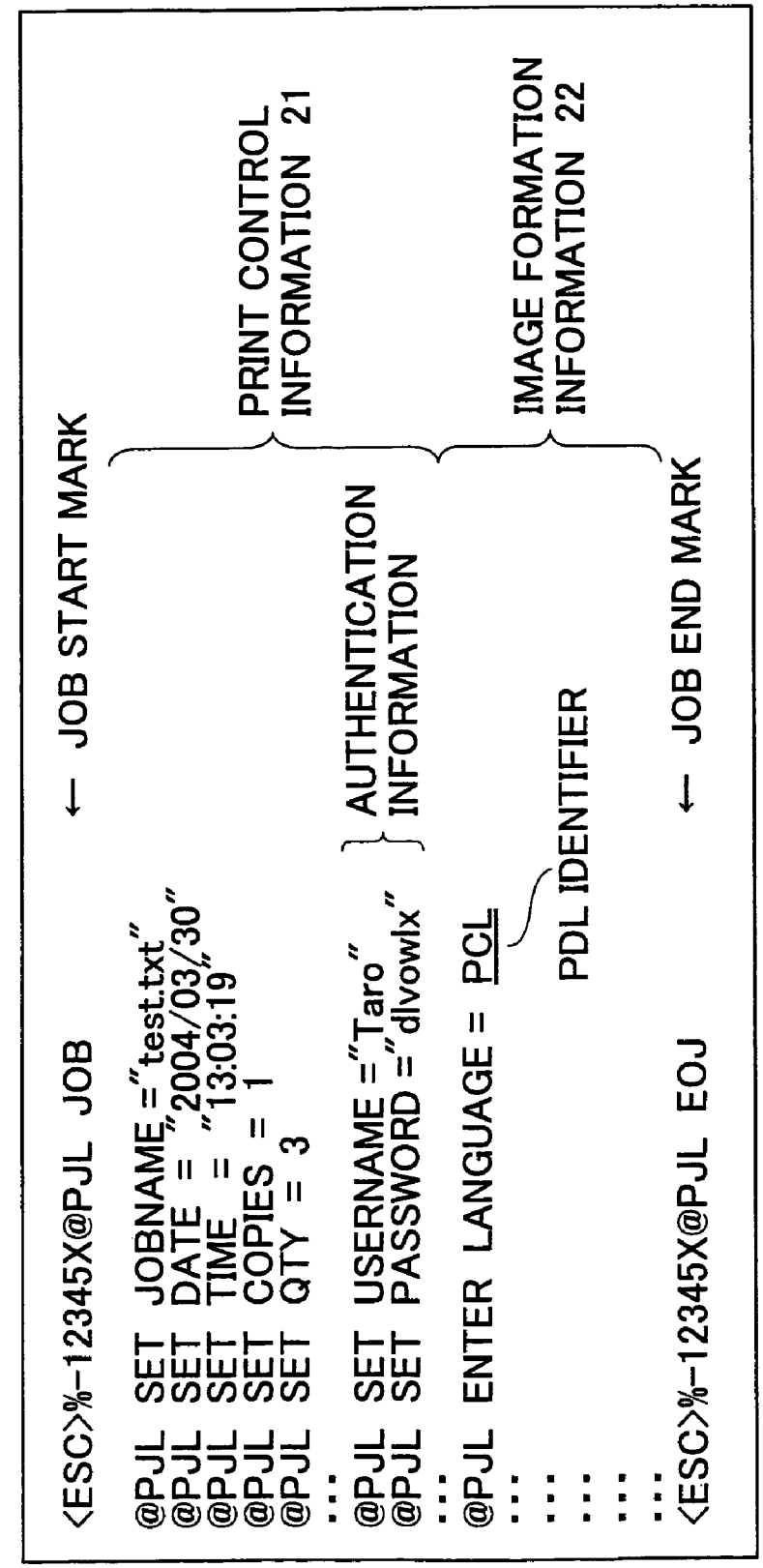
FIG. 2 shows a first example of a print job.

Other than the authentication information shown in FIG. 2, the print control information 21 contains information as to functional instructions to designate a sheet feeder tray, a discharging destination, sheet size, whether to use the stapler, whether to print both sides, or the like. The image formation information is used to form a print image, and is written in PDL (Page Description Language). For example, the image formation information contains a PDL identifier for identifying PDL. The host computers 2 produce the image formation information 22 written in different PDLs for various usages, and transmit the image formation information 22 to the printer 1.

If the print data analyzing unit 12 determines that the print control information 21 contains authentication information such as a user name (a log-in ID) and a password as a result of analyzing the data relating to a printing operation such as a print job, the print data analyzing unit 12 transfers the authentication information to the user authentication managing unit 13.

Based on authentication information such as user names and passwords stored in the address book 131 and the authentication information such as a user name and a password transferred from the operating unit 18 or the print data analyzing unit 12, the user authentication managing unit 13 authenticates the user, and returns the authentication result and, if the authentication is successful, the operations (such as printing and changing the initial setting) that can be performed by the user, to the print data analyzing unit 12.

The information stored in the address book 131 is shown in FIG. 3 and others that will be described later in detail. Although the authentication information has been described as the combinations of user names and passwords, it can be formed with other information items. Also, the user authentication 13 performs actual authentication in the above description. However, the user authentication managing unit 13 may not perform authentication. Instead, an external authentication server or the like connected to the printer 1 via a network may perform actual authentication.

In a case where authentication information does not exist in a print job, the print data analyzing unit 12 regards the print job as a guest job, and adds a value indicating that the print job is a guest job to the print control information 21, which is then stored in the print control information storing unit 121. Examples of the print control information 21 stored in the print control information storing unit 121 are shown in FIGS. 4, 8, and others.

The control/document managing unit 14 accumulates documents in the accumulated document storing unit 141, and, in response to a request, transfers a requested document from the accumulated document storing unit 141 to the image forming unit 15. The control/document managing unit 14 also manages the job history through operation such as storing the history information as to the jobs executed by the printing unit 16 in the job history storing unit 142. An example of the job history information stored in the job history storing unit 142 is shown in FIG. 5.

The control/document managing unit 14 refers to the print control information 21 stored in the print control information storing unit 121. In a case where the subject print job is successfully authenticated and is authorized to perform printing, the control/document managing unit 14 instructs the image forming unit 15 to generate an image.

In a case where the subject print job is a guest job as a result of referring to the print control information 21 stored in the print control information storing unit 121, the control/document managing unit 14 refers to a setting file or the like stored in the NVRAM 143 of the printer 1. In a case where a guest job is allowed or the item "is printing by a guest allowed?" in the setting file indicates a value representing "Yes", for example, the control/document managing unit 14 instructs the image forming unit 15 to generate an image. In a case where a guest job is not allowed or the item "is printing by a guest allowed?" in the setting file indicates a value representing "No", the print job is discarded. Examples of the setting file stored in the NVRAM 143 are shown in FIG. 7 and others.

If there is an instruction from a user through the operating unit 18, the control/document managing unit 14 changes the values in the setting file stored in the NVRAM 143.

The image forming unit 15 is to form an image. For example, in accordance with an instruction from the control/document managing unit 14, the image forming unit 15 generates an image to be used for printing, based on the image formation information 22 stored in the image formation information storing unit 122. The image forming unit 15 transfers the generated image to the printing unit 16, when necessary. For example, if the subject job is a guest job, the image forming unit 15 generates an image that can provide a function (such as black-and-white printing) allowed for guest jobs.

The printing unit 16 is to perform printing, and outputs an image received from the image forming unit 15, as a printed material through the printer engine 17. The printer engine 17 is an engine unit that performs printing.

The printing unit 16 transfers an image received from the image forming unit 15 to the control/document managing unit 14, and requests the control/document managing unit 14 to save the image as an accumulated document. The printing unit 16 also transfers information as to whether printing is successful, the printing user information, and the job history such as the number of printed pages, to the control/document managing unit 14, and then requests the control/document managing unit 14 to save the information as the job history information.

The operating unit 18 serves as an information exchange means between users and the main control unit of the printer 1, and controls an operation panel or the like. For example, the operating unit 18 performs operations such as the operation of notifying the main control unit of the printer 1 of a key operation by a user, the operation of providing a library function or the like for constructing a GUI, the operation of managing the constructed GUI information, and the operation of reflecting the constructed GUI on the operation panel.

The operating unit 18 displays the GUIs shown in FIGS. 10, 11, 13, 14, 15, 16, 17, 19, 21, and 22, on the operation panel, for example. The operating unit 18 transfers authentication information such as a user name and a password that is input by a user to the user authentication managing unit 13, and produces and displays a GUI containing authentication results on the operation panel. The operating unit 18 also refers to the print control information 21 through the control/document managing unit 14, and produces the job information as to the current printing operation, and a GUI containing a list of the accumulated documents stored in the accumulated document storing unit 141. The job information and the GUI containing the accumulated document list are also displayed on the operation panel.

In the following, an example of a print job is described. FIG. 2 illustrates the print job.

As shown in FIG. 2, the print job contains a job start mark, the print control information 21, the image formation information 22, and a job end mark. The print control information 21 contains authentication information including user names and passwords, and the image formation information 22 includes the PDL identifier for identifying PDL.

After determining the subject print job to be a valid print job as a result of analyzing the print job shown in FIG. 2, the print data analyzing unit 12 stores the print control information 21 and the image formation information 22 in the print control information storing unit 121 and the image formation information storing unit 122.

In the following, an example of the information stored in the address book 131 is described. FIG. 3 shows the example of the address book.

As shown in FIG. 3, the address book 131 includes the following items: "Log-In ID", "Password", "Screen Name", "Print", "Is the Person Manager?", and "Number of Sheets Used This Month".

In the "Log-In ID" column, log-in IDs are stored. In the "Password" column, passwords are stored. In the "Screen Name" column, screen names are stored. In the "Print" column, the information as to whether printing is allowed is stored. In the "Is the Person Manager?" column, the information as to whether the person is a manager is stored. In the "Number of Sheets Used This Month" column, the number of pages used for printing in the subject month is stored.

When receiving the authentication information shown in FIG. 2 from the print data analyzing unit 12, the user authentication managing unit 13 compares the authentication information with the log-in IDs and the passwords stored in the address book 131, and then performs authentication. When receiving a log-in user name and a log-in password that are input by a user through the operating unit 18, the user authentication managing unit 13 compares the log-in user name and the log-in password with the log-in IDs and the passwords stored in the address book 131, and then performs authentication.

The control/document managing unit 14 also stores the information as to the number of sheets on which printing has been performed using the printer engine 17 in the address book 131. The number of sheets printed in the subject month stored in the address book 131 can be used for services such as account management.

In the following, an example of the information stored in the print control information storing unit 121 is described. FIG. 4 shows the first example information stored in the print control information storing unit 121.

As shown in FIG. 4, the information stored in the print control information storing unit 121 includes items and values. The items include "Owner ID", "Owner Screen Name", "Number of Printed Copies", "Number of Pages", "Two-Sided", "Stapling", "Document Accumulation", and "Guest Job?".

As described above, when determining that the subject print job is a valid print job as a result of analyzing the print job as shown in FIG. 2, the print data analyzing unit 12 stores the print control information 21 in the print control information storing unit 121. Although not being apparent from FIG. 4, the information shown in FIG. 4 is stored for each job in the print control information storing unit 121. The same applied to the examples described hereafter.

In the following, an example of the job history information stored in the job history storing unit 142 is described. FIG. 5 shows the example of the job history information stored in the job history storing unit 142.

As shown in FIG. 5, the job history information stored in the job history storing unit 142 includes items and values. The items include those continuing from the information stored in the print control information storing unit 121 and those indicating print operation results. The continuing items include "Owner ID", "Owner Screen Name", "Number of Printed Copies""Number of Pages", "Two-Sided", "Stapling", "Document Accumulation", and "Guest Job?". The printing operation result items includes"Print Result""Total Number of Printed Copies", "Total Number of Printed Pages", and "Number of Discarded Sheets Due to Paper Jam". Although not being apparent from FIG. 5, the information shown in FIG. 5 is stored for each job in the job history storing unit 142.

In the following, an example of a guest job is described. FIG. 6 shows a first example of a guest job.

Unlike the job shown in FIG. 2, the job shown in FIG. 6 does not have authentication information included in the print control information 21.

In a case where the print control information 21 does not include authentication information, as shown in FIG. 6, the print data analyzing unit 12 refers to the information as to whether to allow a guest job, which is set in the NVRAM 143 as shown in FIG. 7. If a guest job is allowed, the job shown in FIG. 6 is regarded as a guest job, and a flag (YES) indicating that the job is a guest job is stored as the value of the item "Guest Job?" in the print control information storing unit 121.

In the following, an example of the information set in the NVRAM 143 is described. FIG. 7 shows a first example of the information set in the NVRAM 143.

As shown in FIG. 7, the information set in the NVRAM 143 includes items and values, and the items include "Is Guest Job Allowed?".

For example, the manager of the printer 1 sets "YES" or "NO" in the value of the item "Is Guest Job Allowed?" in the NVRAM 143, thereby determining whether to allow a guest job.

By being able to set whether to allow a guest job, a high-performance printer does not allow guest jobs so as to increase safeness, while a regular printer allows guest jobs so that services relating to print operation such as function limited printing can be provided to a client (a terminal) that cannot add authentication information to the print control information 21.

In the following, another example of the information stored in the print control information storing unit 121 is described. FIG. 8 shows the second example of the information stored in the print control information storing unit 121.

Unlike the information stored in the print control information storing unit 121 shown in FIG. 4, the information stored in the print control information storing unit 121 shown in FIG. 8 does not include the values of the items "Owner ID" and "Owner Screen Name". This is because a guest job does not include authentication information, as shown in FIG. 6. Also, unlike the information stored in the print control information storing unit 121 shown in FIG. 4, the information stored in the print control information storing unit 121 shown in FIG. 8 has "YES" as the value of the item "Guest Job?".

Figure 9:
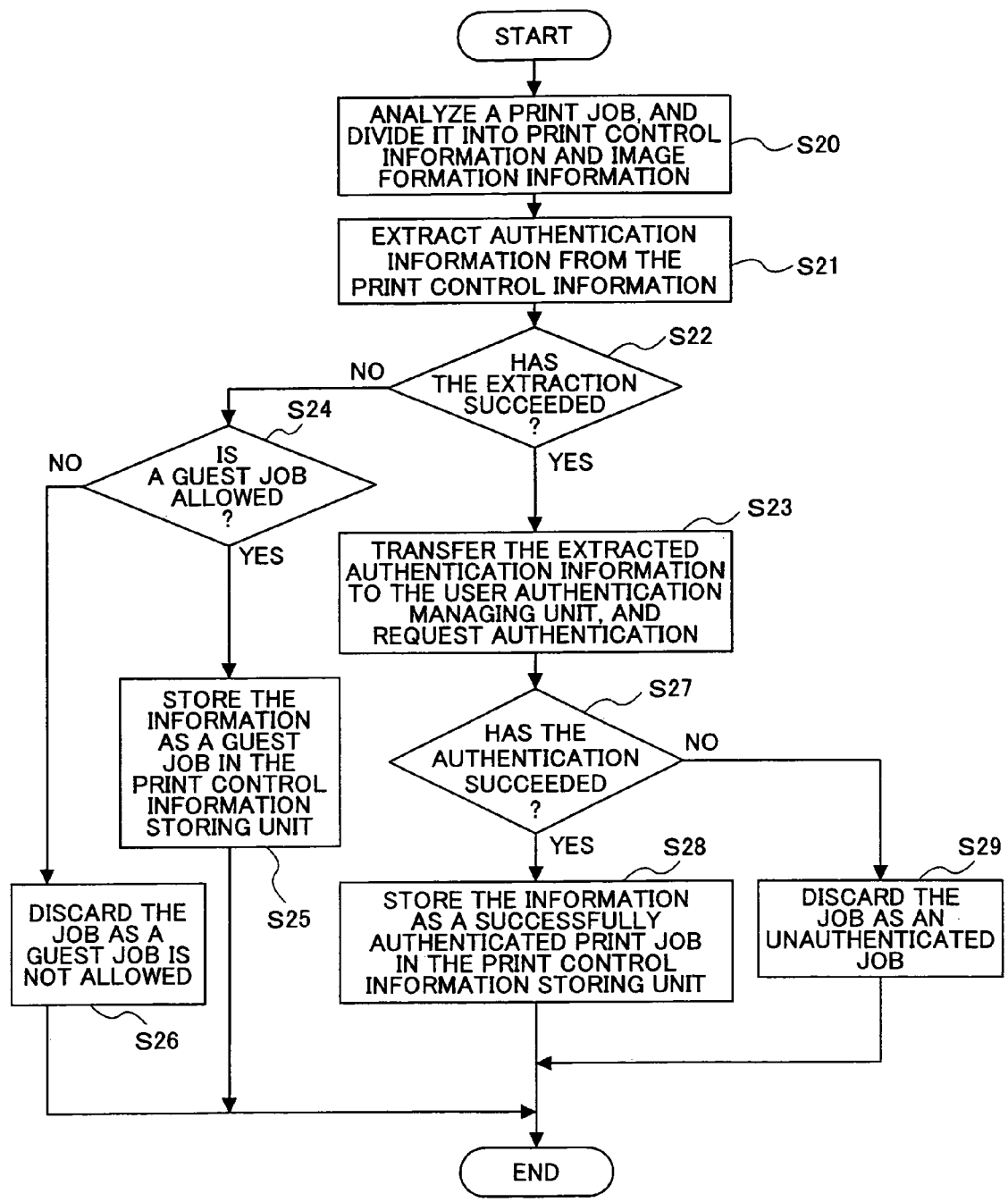
FIG. 9 is a flowchart of a first example of a guest job setting operation.

In the following, an example of a guest job setting operation such as setting a value in the item "Guest Job?" in the print control information storing unit 121 is described. FIG. 9 is a first flowchart of the guest job setting operation.

In step S20, the print data analyzing unit 12 analyzes a print job received via the communication unit 11, and divides it into the print control information 21 and the image formation information 22.

In step S21, the print data analyzing unit 12 extracts authentication information from the print control information 21.

In step S22, the print data analyzing unit 12 determines whether the extraction of authentication information in step S21 has succeeded. If the extraction of authentication information is determined to have succeeded ("YES" in step S22), the print data analyzing unit 12 moves on to step S23. If the extraction of authentication information is determined to have failed ("NO" in step S22), the print data analyzing unit 12 moves on to step S24.

In step S23, the print data analyzing unit 12 transfers the authentication information extracted in step S21 to the user authentication managing unit 13, and requests authentication.

Meanwhile, in step S24, the print data analyzing unit 12 refers to the value of the item "Is Guest Job Allowed?" in the information set in the NVRAM 143 or the like, and determines whether a guest job is allowed. If the print data analyzing unit 12 determines that a guest job is allowed ("YES" in step S24), the operation moves on to step S25. If the print data analyzing unit 12 determines that a guest job is not allowed ("NO" in step S24), the operation moves on to step S26.

In step S25, the print data analyzing unit 12 stores the information as a guest job in the print control information storing unit 121 (see FIG. 8).

Meanwhile, in step S26, the print data analyzing unit 12 discards the job as a guest job is not allowed.

After step S23, the print data analyzing unit 12 moves on to step S27, and determines whether the authentication has succeeded. If the authentication is determined to have succeeded ("YES" in step S27), the print data analyzing unit 12 moves on to step S28. If the authentication is determined to have failed ("NO" in step S27), the print data analyzing unit 12 moves on to step S29. If the user authentication managing unit 13 returns a response to the print data analyzing unit 12 to the effect that the authentication has succeeded, for example, the print data analyzing unit 12 determines that the authentication has succeeded. If the user authentication managing unit 13 returns a response to the print data analyzing unit 12 to the effect that the authentication has failed, the print data analyzing unit 12 determines that the authentication has failed.

In step S28, the print data analyzing unit 12 stores the information as a successfully authenticated print job in the print control information storing unit 121 (see FIG. 4).

Meanwhile, in step S29, the print data analyzing unit 12 discards the job as an unauthenticated print job.

If a guest job is allowed, the printer 1 regards a job that does not have authentication information contained in the print control information 21 as a guest job, and sets a suitable value (such as "YES") in the corresponding item in the information in the print control information storing unit 121 or the like. By setting a guest job in this manner, functional limitations such as allowing only black-and-white printing can be set, and services relating to printing can be provided to clients that exhibit difficulties in having authentication information contained in the print control information 21, such as CAD applications, direct printing applications by PDF, and systems that are formed with mainframes.

By setting a guest job, jobs that are sent from terminals having no special setting (such as setting authentication information in the print control information 21) can be charged as guest jobs in a case where account management is performed without putting limitations on users.

If the user has the authority to operate the printer 1, he/she can read or process the accumulated documents of any guest job.

Figure 10:
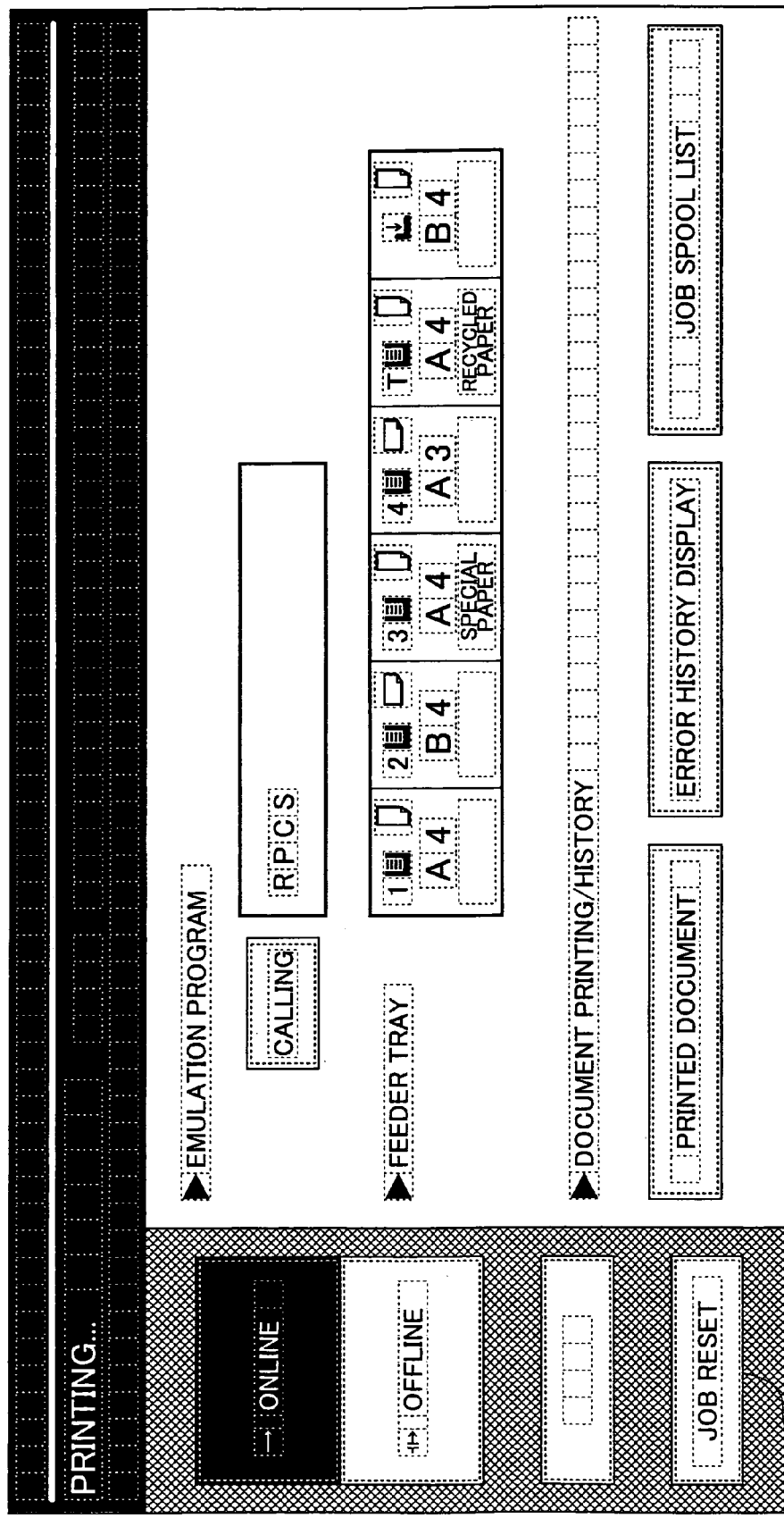
FIG. 10 illustrates an example of a screen during a printing operation.

In the following, an example of the authenticating and printer use allowing operation relating to job resetting is described, with reference to FIGS. 10 through 17. FIG. 10 illustrates an example of a printing screen.

While a document is being printed, the operating unit 18 produces a printing screen 200 as shown in FIG. 10, and displays the printing screen 200 on the operation panel. When an event to the effect that a job reset button 201 is pressed by a user is received on the printing screen 200 as shown in FIG. 10, the operating unit 18 produces a job reset confirmation screen 210 as shown in FIG. 11, and displays the job reset confirmation screen 210 on the operation panel.

Figure 11:
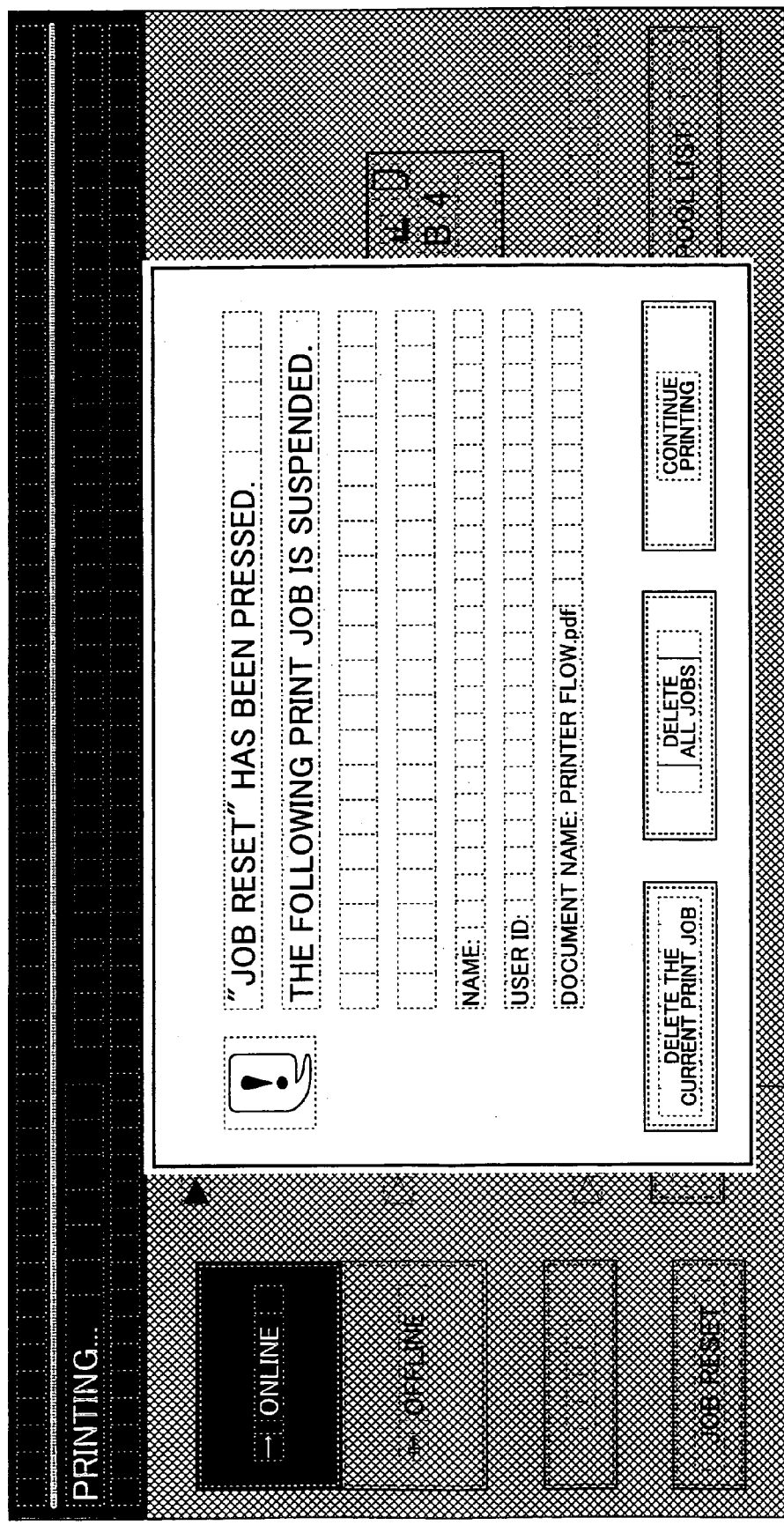
FIG. 11 illustrates an example of a job reset confirmation screen.

FIG. 11 illustrates an example of the job reset confirmation screen 210. As shown in FIG. 11, the job reset confirmation screen 210 includes a printing job delete button 211 and the likes.

Figure 12:
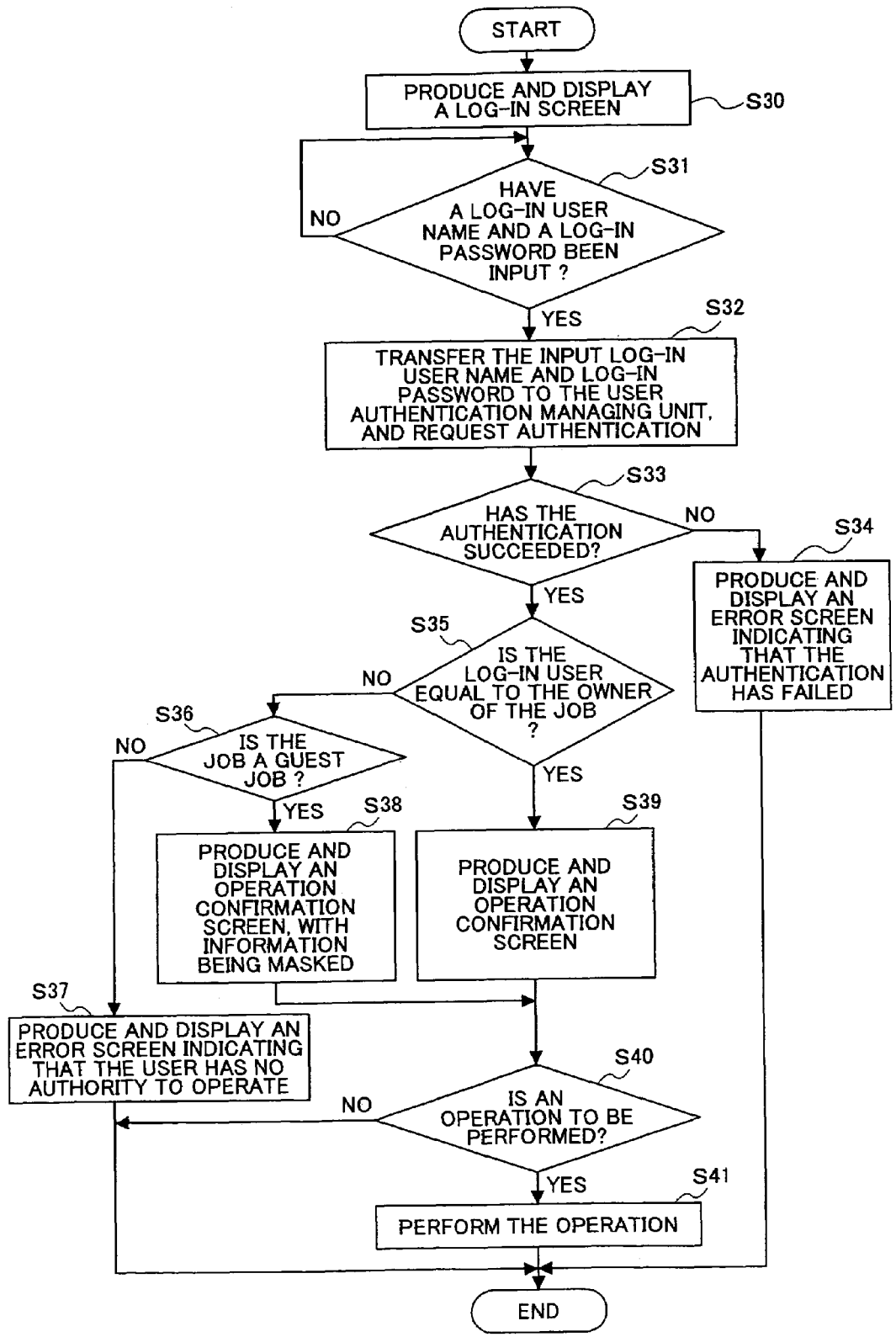
FIG. 12 is a flowchart of a first example of an authentication and printer use allowing operation.

In the following, an example of the authenticating and printer use allowing operation relating to job resetting is described. FIG. 12 is a first flowchart of the authenticating and printer use allowing operation.

Figure 13:
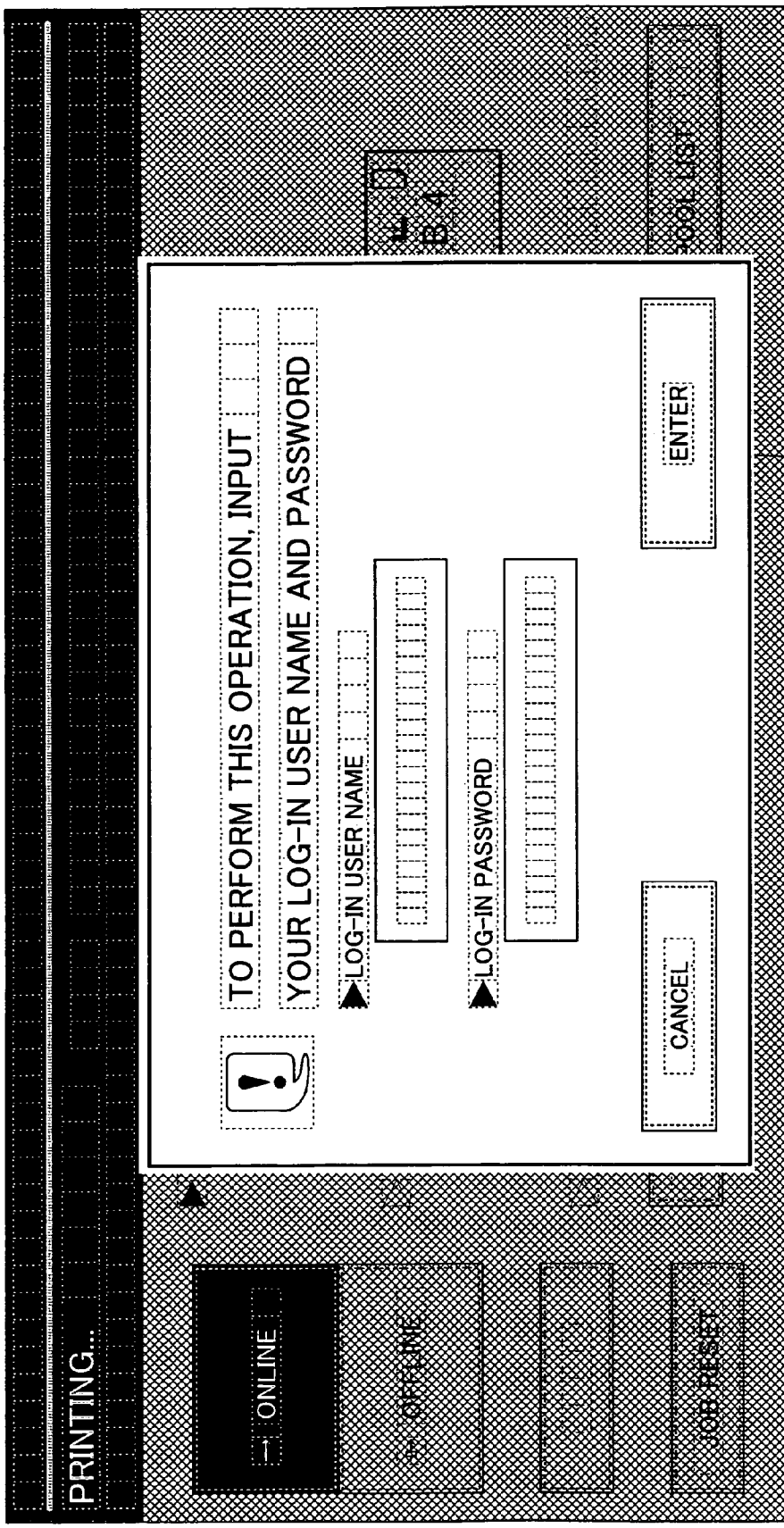
FIG. 13 illustrates an example of a log-in user name and log-in password input screen.

In step S30, upon receipt of an event to the effect that the printing job delete button 211 is pressed by a user on the job reset confirmation screen 210 as shown in FIG. 11, the operating unit 18 produces a log-in user name and log-in password input screen 220 as shown in FIG. 13, and displays it on the operation panel.

FIG. 13 shows an example of the log-in user name and log-in password input screen 220. As shown in FIG. 13, the log-in name and log-in password input screen 220 includes a log-in user name input area for inputting a log-in user name, a log-in password input area for inputting a log-in password, and an enter button 221.

In FIG. 12, the operation moves on to step S31 following step S30, the operating unit 18 determines whether a user has input a log-in user name and a log-in password, and has pressed the enter button 221 on the log-in user name and log-in user password input screen 220 as shown in FIG. 13. If the operating unit 18 determines that a user has input a log-in user name and a log-in password, and has pressed the enter button 221 ("YES" in step S31), the operation moves on to step S32. If the operating unit 18 determines that a user has not input a log-in user name and a log-in password or has not pressed the enter button 221 through having input a log-in user name and a log-in password ("NO" in step S31), the procedure of step S31 is repeated.

In step S32, upon receipt of the log-in user name and the log-in password that have been input by a user via the operating unit 18, the control/document managing unit 14 transfers the log-in user name and the log-in password to the user authentication managing unit 13, and requests authentication.

The operation moves on to step S33, and the control/document managing unit 14 determines whether the authentication has succeeded. If the authentication is determined to have succeeded ("YES" in step S33), the control/document managing unit 14 moves on to step S35. If the authentication is determined to have failed ("NO" in step S33), the control/document managing unit 14 moves on to step S34.

Figure 14:
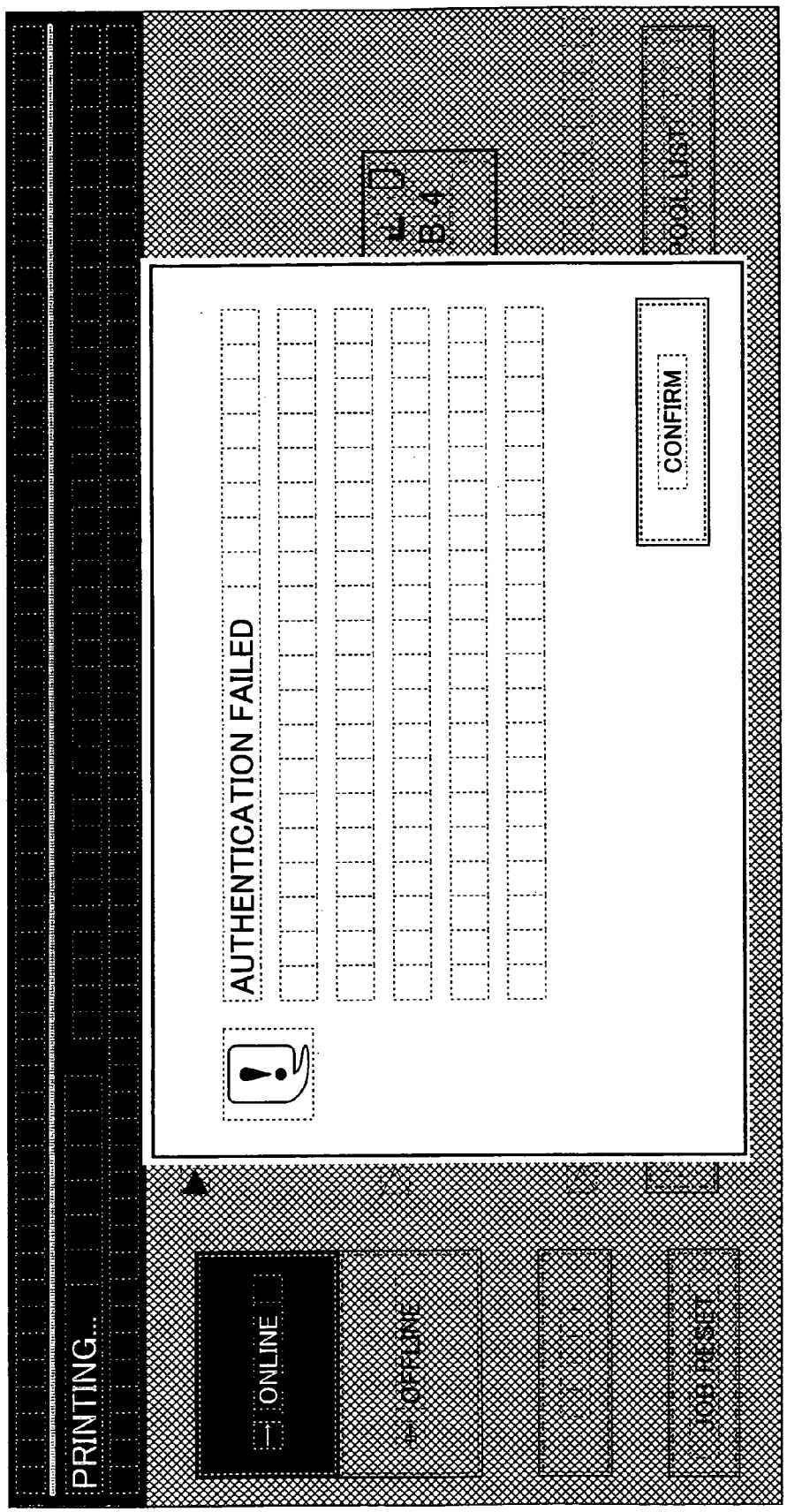
FIG. 14 shows a first example of an error screen.

In step S34, upon receipt of the information to the effect that the authentication has failed from the control/document managing unit 14, the operating unit 18 produces an error screen 230 indicating that the authentication has failed, as shown in FIG. 14, and displays the error screen 230 on the operation panel. FIG. 14 shows a first example of an error screen.

Meanwhile, in step S35 of FIG. 12, the control/document managing unit 14 determines whether the log-in user name that has been input by the user matches the owner of the current printing job that is about to be deleted. If the control/document managing unit 14 determines that the log-in user name that has been input by the user match the owner of the current printing job to be deleted ("YES" in step S35), the operation moves on to step S39. If the control/document managing unit 14 determines that the log-in user name that has been input by the user does not match the owner of the current printing job to be deleted ("NO" in step S35), the operation moves on to step S36.

For example, the control/document managing unit 14 compares the log-in user name that has been input by the user with the value of the item "Owner ID" of the corresponding information stored in the print control information storing unit 121, and determines whether the log-in user name that has been input by the user matches the owner of the current printing job that is about to be deleted.

In step S36, the control/document managing unit 14 determines whether the printing job to be deleted is a guest job. If the control/document managing unit 14 determines that the current printing job to be deleted is a guest job ("YES" in step S36), the operation moves on to step S38. If the control/document managing unit 14 determines that the current printing job to be deleted is not a guest job ("NO" in step S36), the operation moves on to step S37.

For example, the control/document managing unit 14 refers to the value of the item "Guest Job?" of the corresponding information stored in the print control information storing unit 121, and determines whether the job to be executed is a guest job.

Figure 15:
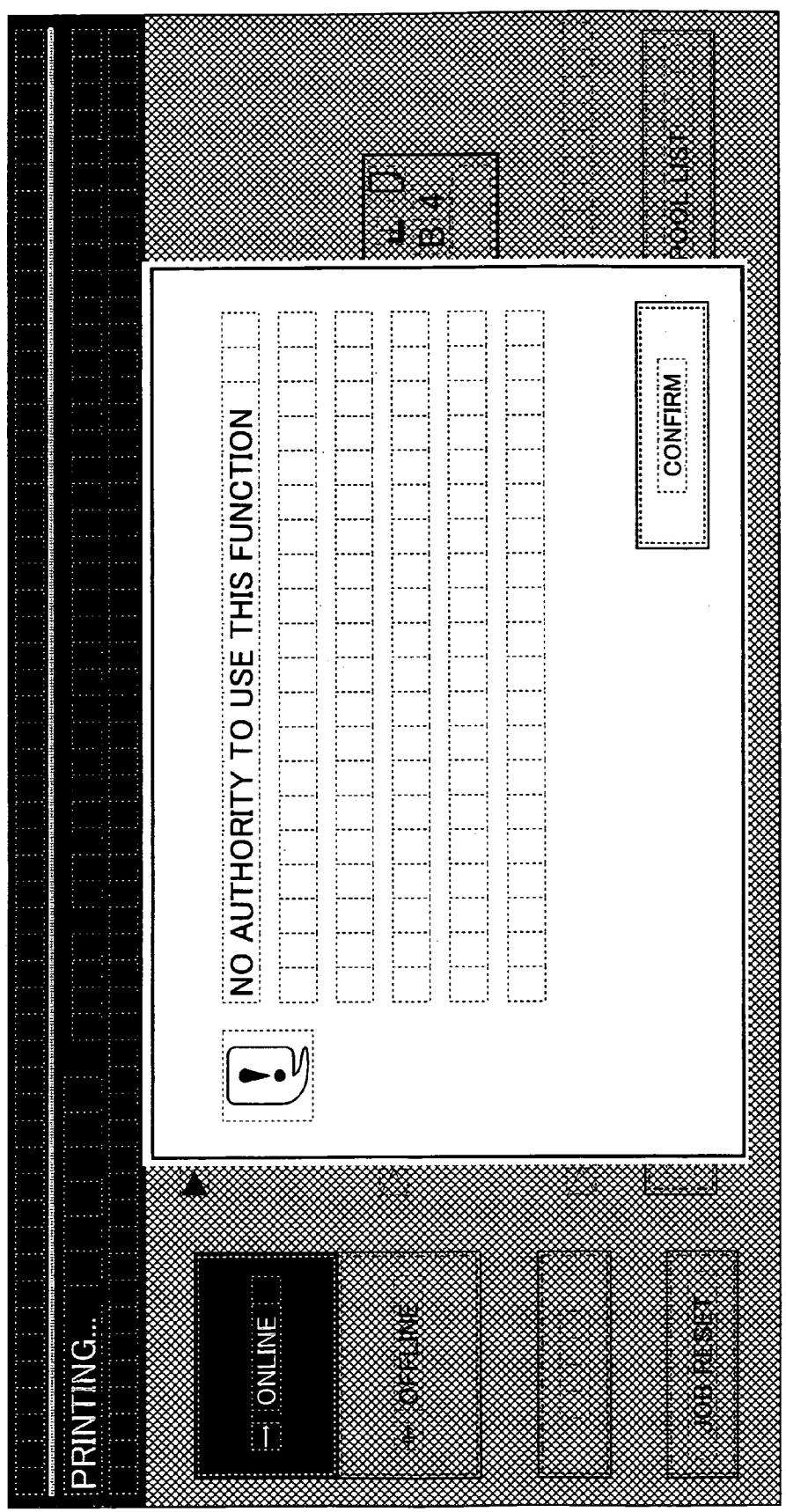
FIG. 15 shows a second example of an error screen.

In step S37, the operating unit 18 that has received the information to the effect that the current printing job is not a guest job produces an error screen 240 shown in FIG. 15 indicating that the user does not have the authority to use the function (the job reset function), and displays the error screen 240 on the operation panel. FIG. 15 shows a second example of an error screen.

Figure 16:
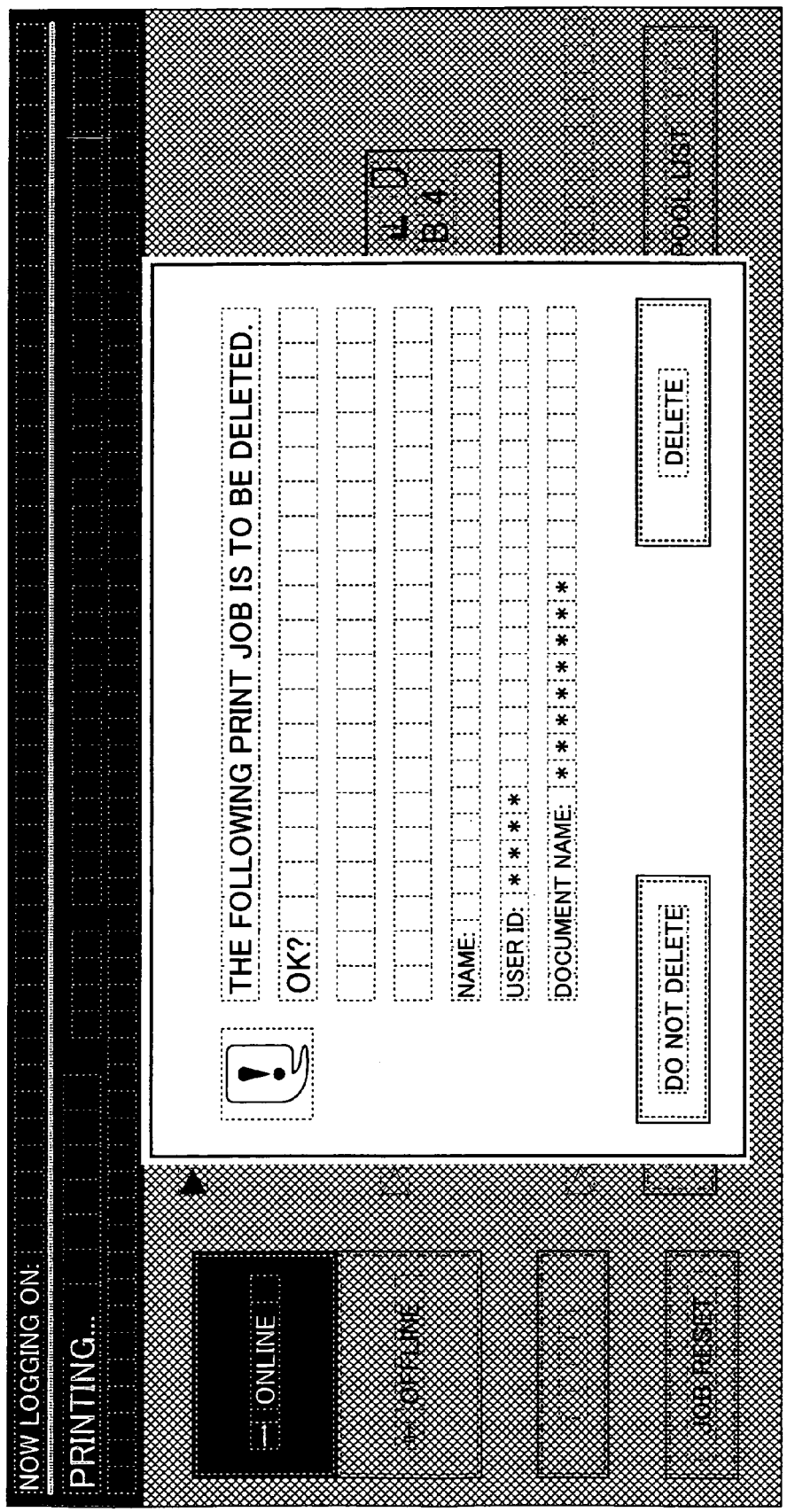
FIG. 16 shows a first example of an operation confirmation screen.

Meanwhile, in step S38 of FIG. 12, the operating unit 18 that has received the information to the effect that the current printing job is a guest job produces an operation confirmation screen 250 as shown in FIG. 16, and displays the operation confirmation screen 250 on the operation panel. FIG. 16 shows a first example of an operation confirmation screen. As shown in FIG. 16, when a general user executes a guest job, part of the information is hidden on the display. In this manner, while users who have the authority to operate the printer 1 are allowed to perform predetermined operations, the users are shut out from part of the information, so that higher security is achieved.

Figure 17:
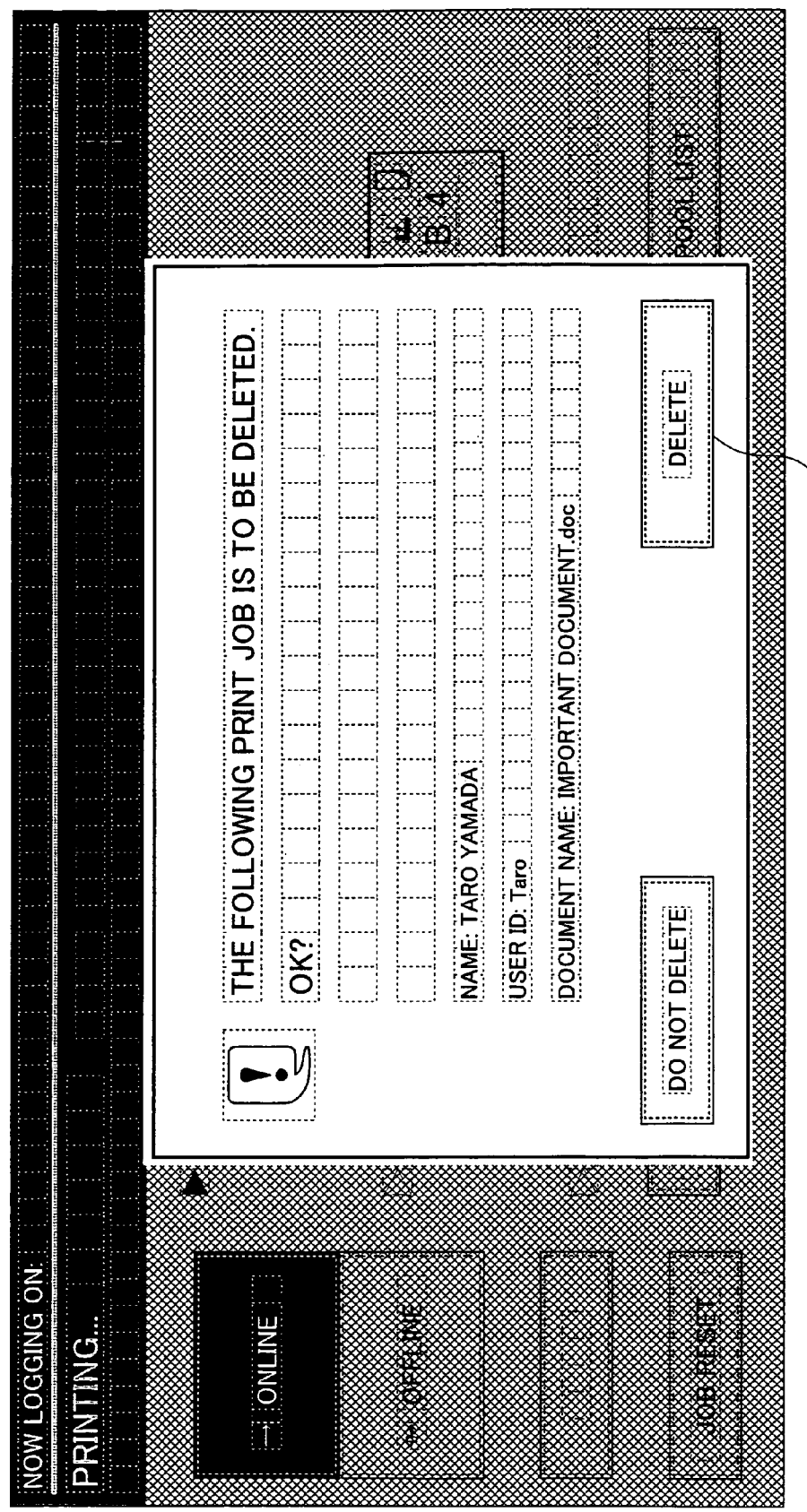
FIG. 17 shows a second example of an operation confirmation screen.

In step S39 of FIG. 12, the operating unit 18 that has received the information to the effect that the log-in user name input by the user matches the owner of the current printing job to be deleted produces an operation confirmation screen 250 as shown in FIG. 17, and displays the operation confirmation screen 250 on the operation panel. FIG. 17 shows a second example of an operation confirmation screen. As shown in FIG. 17, when the owner executes the printing job, the information is not hidden but is displayed on the screen, unlike the example shown in FIG. 16.

Figure 18:
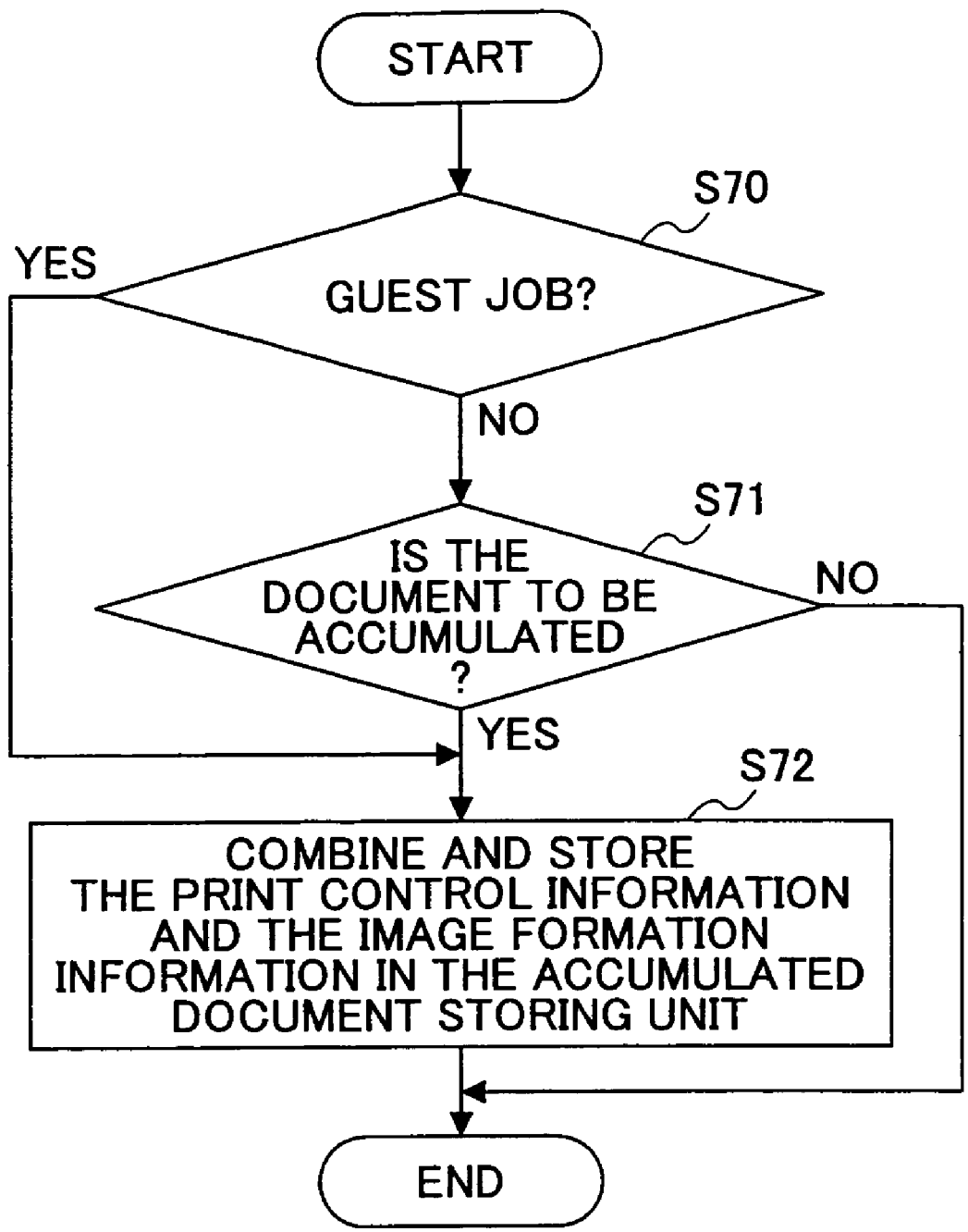
FIG. 18 is a flowchart of an example of a document accumulating operation.

In the following, an example of the document accumulating operation is described. FIG. 18 is a flowchart of the example of the document accumulating operation.

After the guest job setting operation shown in FIG. 9, the control/document managing unit 14 determines whether the job to be executed is a guest job in step S70. If the control/document managing unit 14 determines that the job to be executed is a guest job ("YES" in step S70), the operation moves on to step S72. If the control/document managing unit 14 determines that the job to be executed is not a guest job ("NO" in step S70), the operation moves on to step S71.

For example, the control/document managing unit 14 refers to the value of the item "Guest Job?" of the corresponding information stored in the print control information storing unit 121, and determines whether the job to be executed is a guest job.

In step S71, the control/document managing unit 14 determines whether the document of the job to be executed is to be accumulated. If the control/document managing unit 14 determines that the document of the job to be executed is to be accumulated ("YES" in step S71), the operation moves on to step S72. If the control/document managing unit 14 determines that the document of the job to be executed is not to be accumulated ("NO" in step S71), the operation comes to an end. For example, the job whose document is not to be accumulated is transferred to the image forming unit 15 or the like, and printing is performed.

For example, the control/document managing unit 14 refers to the value of the item "Document Accumulation" of the corresponding information stored in the print control information storing unit 121.

In step S72, the control/document managing unit 14 combines the print control information 21 and the image formation information 22 as the document, and stores the document in the accumulated document storing unit 141.

By performing the document accumulating operation shown in FIG. 18, the document of each guest job can be constantly accumulated in the printer 1.

Figure 19:
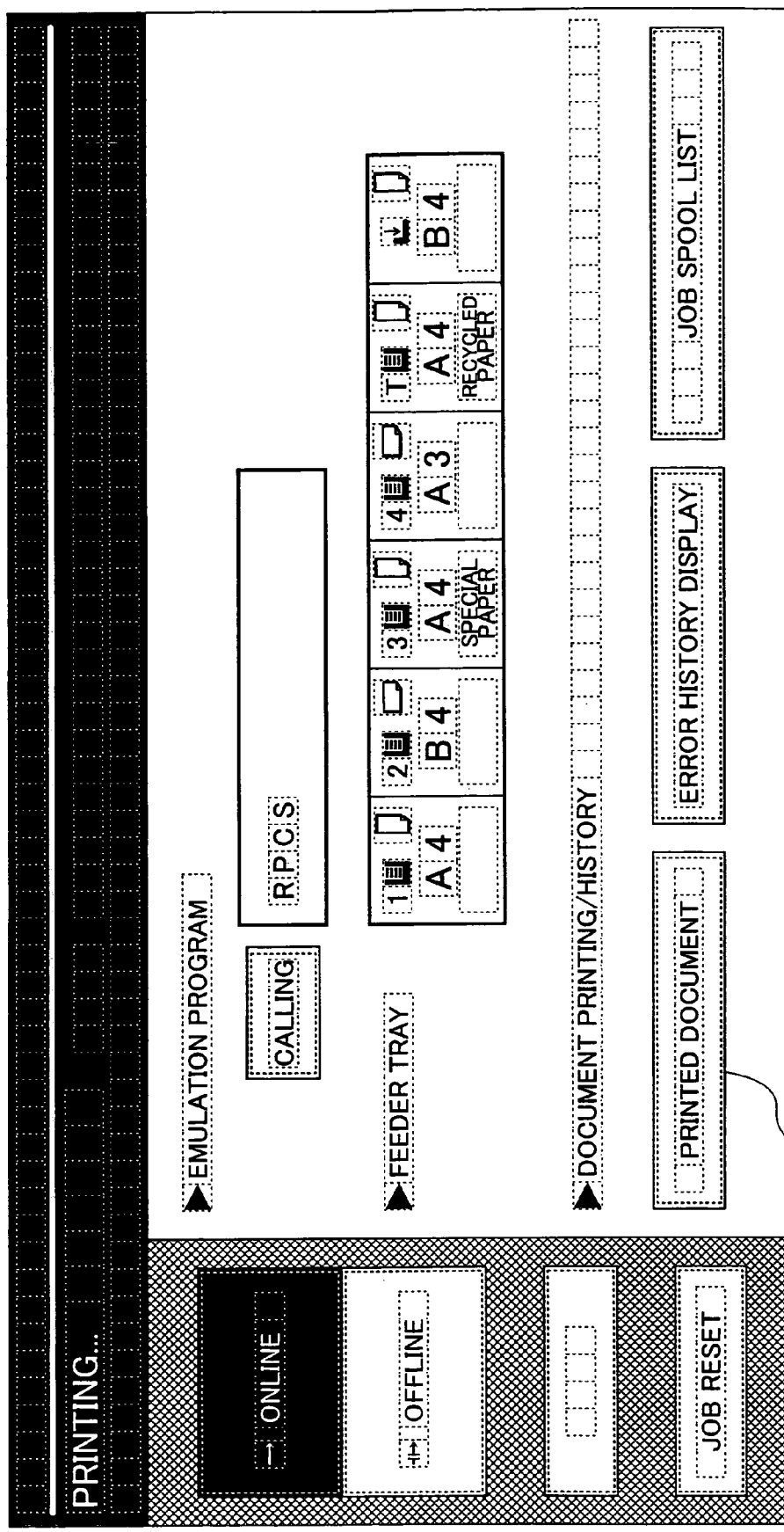
FIG. 19 illustrates an example of an accumulated document handling screen.

Referring now to FIGS. 19 through 22, the accumulated document printing operation is described. FIG. 19 shows an example of an accumulated document handling screen.

In response to a request from a user, the operating unit 18 produces an accumulated document handling screen 260 as shown in FIG. 19, and displays the accumulated document handling screen 260 on the operation panel.

Figure 20:
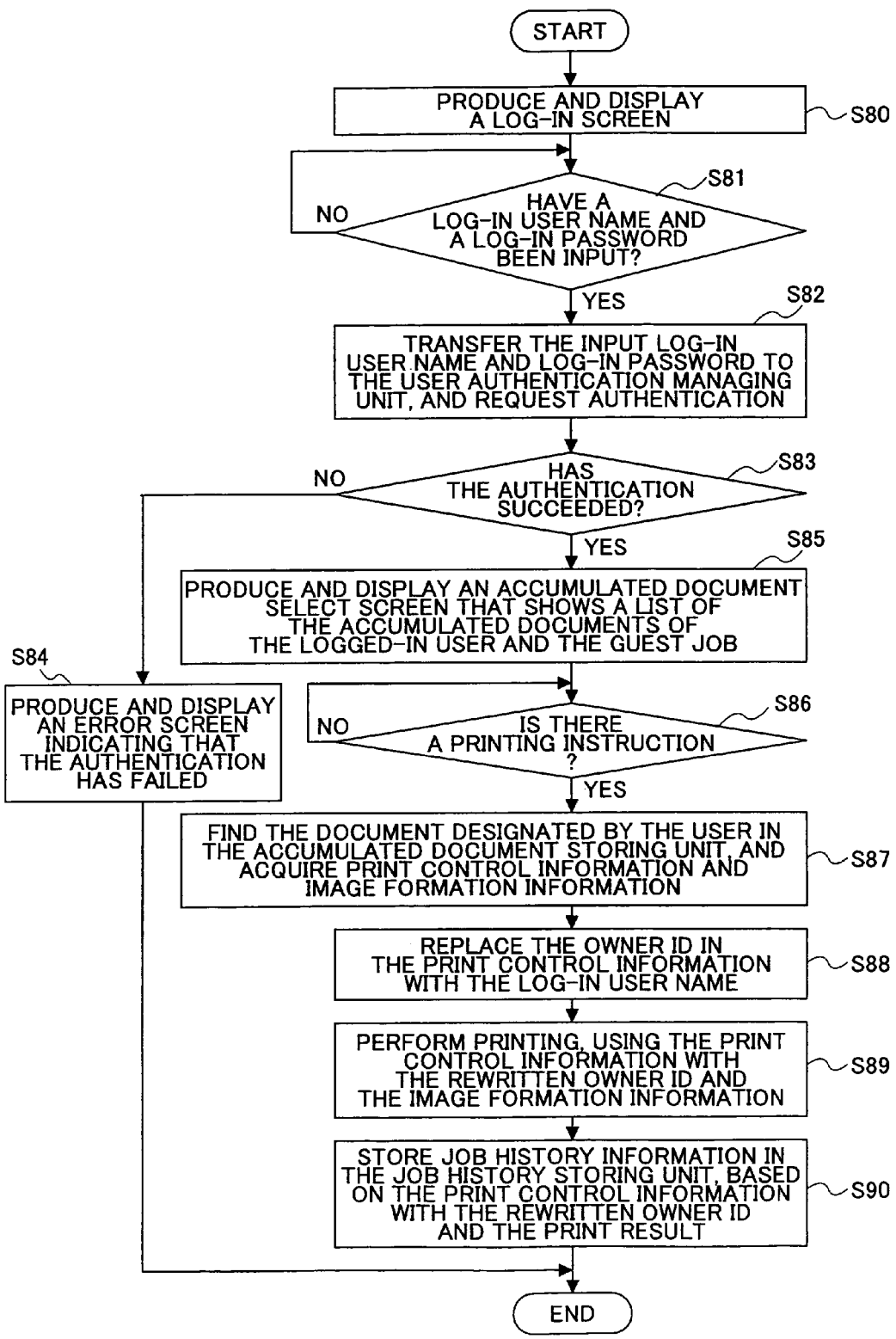
FIG. 20 is a flowchart of an example of an accumulated document printing operation.

FIG. 20 is a flowchart of an example of the accumulated document printing operation. In step S80, upon receipt of an event to the effect that a document print button 261 is pressed by a user on the accumulated document handling screen 260 shown in FIG. 19, the operating unit 18 produces the log-in user name and log-in password input screen 220 shown in FIG. 13, and displays the log-in user name and log-in password input screen 220 on the operation panel.

After step S80, the operation moves on to step S81, and the operating unit 18 determines whether a log-in user name and a log-in password have been input by a user and the enter button 221 has been pressed by the user on the log-in user name and log-in password input screen 220 shown in FIG. 13. If the operating unit 18 determines that a log-in user name and a log-in password have been input by a user and the enter button 221 has been pressed by the user ("YES" in step S81), the operation moves on to step S82. If the operating unit 18 determines that a log-in user name and a log-in password have not been input by a user, or the enter button 221 has not been pressed by the user though a log-in user name and a log-in password have been entered ("NO" in step S81), the procedure of step S81 is repeated.

In step S82, the control/document managing unit 14 that has received the log-in user name and the log-in password input by the user via the operating unit 18 transfers the log-in user name and the log-in password to the user authentication managing unit 13, and requests authentication.

After step S82, the operation moves on to step S83, and the control/document managing unit 14 determines whether the authentication has succeeded. If the control/document managing unit 14 determines that the authentication has succeeded ("YES" in step S83), the operation moves on to step S85. If the control/document managing unit 14 determines that the authentication has failed ("NO" in step S83), the operation moves on to step S84.

In step S84, the operating unit 18 that has received the information to the effect that the authentication has failed from the control/document managing unit 14 produces the error screen 230 indicating that the authentication has failed as shown in FIG. 14, and displays the error screen 230 on the operation panel.

Meanwhile, in step S85 of FIG. 20, the operating unit 18 not only produces a list containing the accumulated document under the log-in user name input by the user and the accumulated document of the guest job, but also produces an accumulated document select screen 270 containing the list, as shown in FIG. 21. The accumulated document select screen 270 is displayed on the operation panel.

FIG. 21 shows a first example of an accumulated document select screen. As shown in FIG. 21, the accumulated document select screen 270 includes the list of accumulated documents and a print continue button 271.

In the flowchart of FIG. 20, the operation moves on to step S86 following step S85, the operating unit 18 determines whether an accumulated document has been selected and the print continue button 271 has been pressed by the user on the accumulated document select screen 270 shown in FIG. 21. If the operating unit 18 determines that an accumulated document has been selected and the print continue button 271 has been pressed by the user ("YES" in step S86), the operation moves on to step S87. If the operating unit 18 determines that an accumulated document has not been selected by the user, or the print continue button 271 has not been pressed though an accumulated document has been selected ("NO" in step S86), the procedure of step S86 is repeated.

In step S87, the control/document managing unit 14, which has received a document ID or the like for identifying the accumulated document designated by the user via the operating unit 18, acquires the accumulated document (such as the print control information 21 and the image formation information 22) from the accumulated document storing unit 141, based on the document ID.

The operation moves on to step S88, the control/document managing unit 14 replaces the owner ID of the print control information acquired in step S87 with the log-in user name input by the user.

The operation moves on to step S89, the control/document control document 14 transfers the print control information 21 and the image formation information 22 with the rewritten owner ID to the image forming unit 15, and requests a printing operation.

The operation moves on to step S90, the control/document managing unit 14, which has received a print result from the printing unit 17 or the like, stores job history information in the job history storing unit 142, based on the print control information 21 with the rewritten owner ID and the print result.

By performing the operation shown in FIG. 20, the printing (or the reprinting) of an accumulated document can be handled as the job of the user who has issued the print instruction. As for the accumulated document of a guest job, account management and error management can also be performed.

If the information to the effect that the authentication has succeeded and the log-in user name and the log-in password input by the user are of the manager is received from the user authentication managing unit 13 in step S83 in FIG. 20, the control/document managing unit 14 transfers the information to the operating unit 18. In step S85, the operating unit 18 then produces an accumulated document select screen 280 as shown in FIG. 22, and displays the accumulated document select screen 280 on the operation panel.

Figure 22:
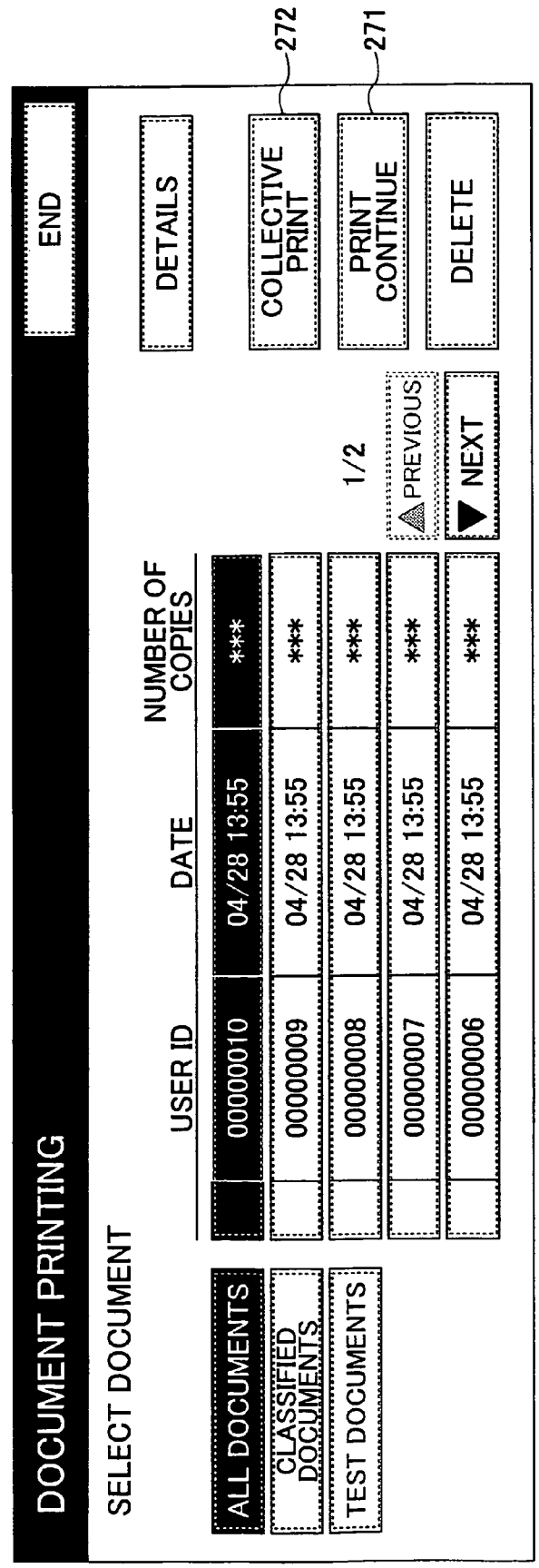
FIG. 22 illustrates a second example of an accumulated document select screen.

FIG. 22 shows a second example of an accumulated document select screen. The accumulated document select screen 280 includes a collective print button 272, unlike the accumulated document select screen 270.

If the user is the manager of the printer 1, the screen shown in FIG. 22 is displayed on the operation panel, so that the manager can instruct the printer 1 to collectively print the accumulated documents shown on the list with the collective print button 272, even if there are many accumulated documents to be printed at once.

The control/document managing unit 14, which has received the event to the effect that the collective print button 272 has been pressed via the operating unit 18, acquires the accumulated documents (such as the print control information 21 and the image formation information 22) from the accumulated document storing unit 141 based on all the document IDs shown on the list in step S87 in FIG. 20, and carries out the procedures of steps S88 through S90 in FIG. 20.

Second Embodiment

In the first embodiment, a print job not containing authentication information is handled as a guest job, as shown in FIG. 6. However, the print control information 21 may include identification information or the like clearly indicting the job is a guest job. In the following, the differences between the first embodiment and the second embodiment are described.

FIG. 23 shows a second example of a guest job. The job shown in FIG. 23 contains guest job identification information "GUEST=TRUE" (or "TRUE") that clearly indicates that the job is a guest job, as described above.

Upon receipt of the job shown in FIG. 23, the print data analyzing unit 12 refers to the information as to whether a guest job is allowed in the NVRAM 143 as shown in FIG. 7. If a guest job is allowed, the print data analyzing unit 12 regards the job shown in FIG. 23 as a guest job, and stores a flag "YES" as the value of the item "Is Guest Job Allowed?" in the print control information storing unit 121.

In the following, another example of the information stored in the print control information storing unit 121 is described. FIG. 24 shows a third example of the information stored in the print control information storing unit 121.

Unlike the information stored in the print control information storing unit 121 shown in FIG. 8, the information stored in the print control information storing unit 121 shown in FIG. 24 contains the values of the owner ID and the owner screen name. This is because the guest job of the second embodiment contains authentication information, as shown in FIG. 23.

Since the information of the owner is contained in the guest job, the name and the user ID are displayed based on the information of the owner (the authentication information), and the number of sheets to be printed can be controlled based on the information of the owner, as shown in FIG. 17, while reading and reprinting are allowed for anyone as the job is regarded as a guest job.

In the following, the operation of managing the number of sheets to be printed according to the first embodiment is described. FIG. 25 shows a first example of an address book.

As shown in FIG. 25, authentication information is not contained in a guest job in the first embodiment. Therefore, when a guest performs printing, the "Number of Sheets used This Month" in the row of the log-in ID "Guest" is increased from 42 to 59, for example.

In the following, the print number managing operation according to the second embodiment is described. FIG. 26 shows a second example of an address book.

As shown in FIG. 26, authentication information is contained in a guest job in the second embodiment. Accordingly, when printing is performed as a guest job, the "Number of Sheets Used This Month" in the row of the log-in ID "Taro" contained in the authentication information is increased from 238 to 259, for example.

In the following, another example of a guest job setting operation, such as setting a value in the item "Guest Job?" in the print control information storing unit 121, is described. FIG. 27 is a flowchart of a second example of a guest job setting operation.

In step S100, the print data analyzing unit 12 analyzes a print job that is received via the communication unit 11, and divides the print job into the print control information 21 and the image formation information 22.

The operation moves on to step S101 from step S100, and the print data analyzing unit 12 extracts guest job identification information from the print control information 21.

The operation moves on to step S102 from step S101, and the print data analyzing unit 12 determines whether the extraction of the guest job identification information in step S101 has succeeded. If the print data analyzing unit 12 determines that the extraction of the guest job identification information has succeeded ("YES" in step S102), the operation moves on to step S103. If the print data analyzing unit 12 determines that the extraction of the guest job identification information has failed ("NO" in step S102), the operation moves on to step S105.

In step S103, the print data analyzing unit 12 refers to the value of the item "Is Guest Job Allowed?" in the information set in the NVRAM 143 or the like, and determines whether a guest job is allowed. If the print data analyzing unit 12 determines that a guest job is allowed ("YES" in step S103), the operation moves on to step S104. If the print data analyzing unit 12 determines that a guest job is not allowed ("NO" in step S103), the operation moves on to step S105.

In step S104, the print data analyzing unit 12 stores the information as a guest job in the print control information storing unit 121 (see FIG. 24).

Meanwhile, in step S105, the print data analyzing unit 12 extracts authentication information from the print control information 21.

The operation moves on to step S106 from step S105, and the print data analyzing unit 12 determines whether the extraction of authentication information in step S105 has succeeded. If the print data analyzing unit 12 determines that the extraction of authentication information has succeeded ("YES" in step S106), the operation moves on to step S107. If the print data analyzing unit 12 determines that the extraction of authentication information has failed ("NO" in step S106), the operation moves on to step S109.

In step S107, the print data analyzing unit 12 transfers the authentication information extracted in step S106 to the user authentication managing unit 13, and requests authentication.

The operation moves on to step S108 from step S107, the print data analyzing unit 12 determines whether the authentication has succeeded. If the print data analyzing unit 12 determines that the authentication has succeeded ("YES" in step S108) the operation moves on to step S110. If the print data analyzing unit 12 determines that the authentication has failed ("NO" in step S108), the operation moves on to step S109. When receiving a response to the effect that the authentication has succeeded from the user authentication managing unit 13, the print data analyzing unit 12 determines that the authentication has succeeded. When receiving a response to the effect that the authentication has failed from the user authentication managing unit 13, the print data analyzing unit 12 determines that the authentication has failed.

In step S109, the print data analyzing unit 12 discards the job.

Meanwhile, in step S110, the print data analyzing unit 12 stores the information as a successfully authenticated print job in the print control information storing unit 121 (see FIG. 4).

By performing the operation shown in FIG. 27, the printer 1 can regard the job containing the guest job identification information in the print job and set the value "YES" in the item of the corresponding information in the print control information storing unit 121 or the like, if a guest job is allowed.

Third Embodiment

In the first embodiment, a print job not containing authentication information is handled as a guest job, as shown in FIG. 6. In the second embodiment, a print job containing guest job identification information is handled as a guest job. However, whether the interface that has received the job is set as an interface to be regarded as a guest may be added to the criteria for determining a guest job, including the criterion according to the first embodiment, which is "the print job does not contain authentication information", and the criterion according to the second embodiment, which is "the print job contains guest job identification information".

However, for ease of explanation in the following description, the printer 1 determines a guest job, using the criterion that is "the interface that has received the job is set as an interface to be regarded as a guest", as well as the criterion according to the first embodiment, which is "the print job does not contain authentication information". This does not limit the scope of the present invention. In the following, the differences between the third embodiment and the first embodiment and/or second embodiment are described.

In the following, another example of the information that is set in the NVRAM 143 is described. FIG. 28 shows a second example of the information that is set in the NVRAM 143.

As shown in FIG. 28, the information set in the NVRAM 143 includes items and values, and the items include "Is Printing by a Guest Allowed?" and "Interfaces to be Regarded as Guests". As the values of the item "Interfaces to be Regarded as Guests", "No Designation", "IEEE1284", "IEEE1394", and the likes are stored.

The manager of the printer 1 can set the value of the item "Interfaces to be Regarded as Guests" in the NVRAM 143 via the operating unit 18 or the like.

Figure 29:
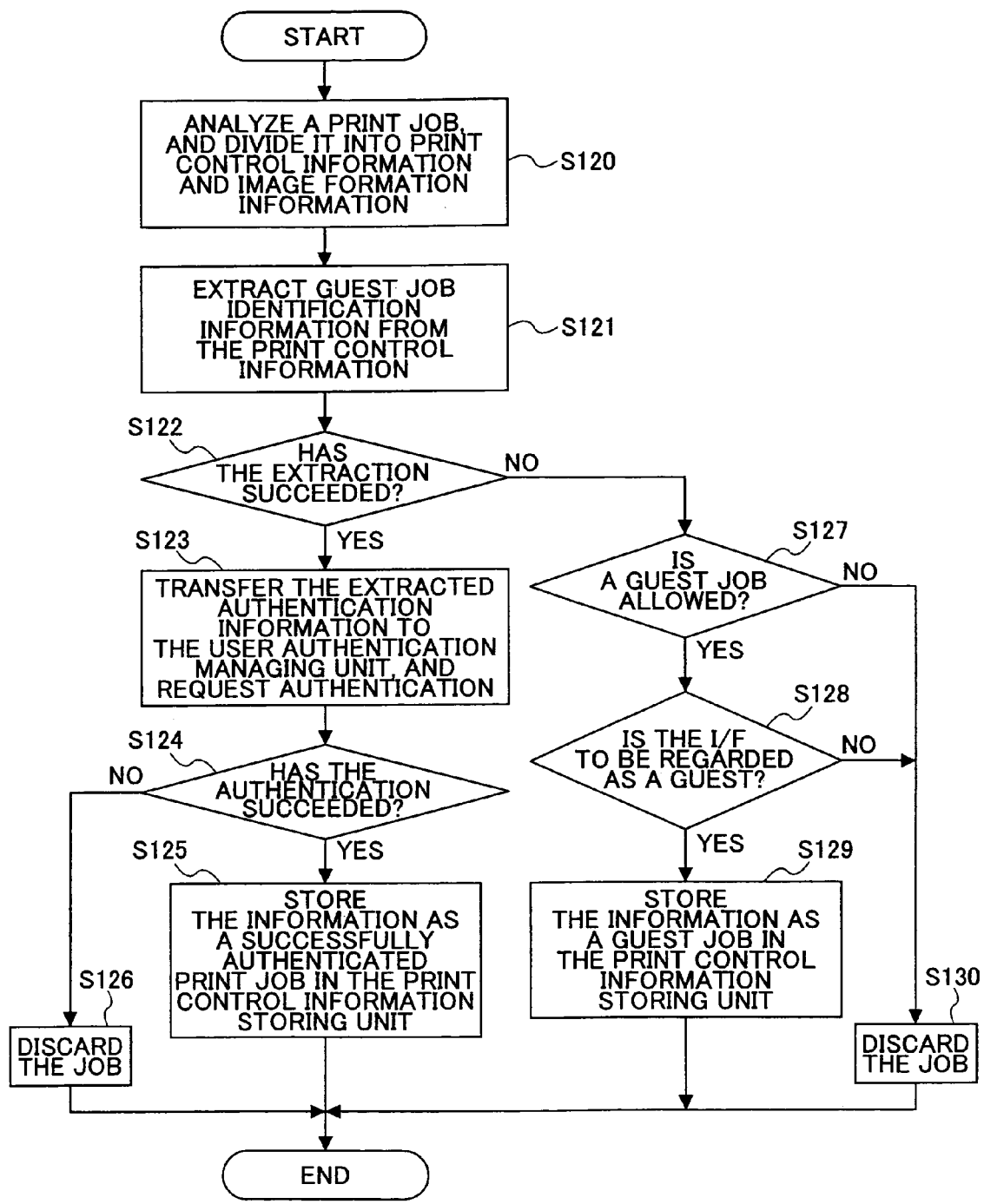
FIG. 29 is a flowchart of a third example of a guest job setting operation.

In the following, another example of a guest job setting operation, such as setting a value in the item "Guest Job?" in the print control information storing unit 121, is described. FIG. 29 is a flowchart of a third example of a guest job setting operation.

In step S120, the print data analyzing unit 12 analyzes a print job that has been received via the communication unit 11, and divides the print job into the print control information 21 and the image formation information 22.

The operation moves on to step S121 from step S120, and the print data analyzing unit 12 extracts authentication information from the print control information 21.

The operation moves on to step S122 from step S121, and the print data analyzing unit 12 determines whether the extraction of authentication information in step S121 has succeeded. If the print data analyzing unit 12 determines that the extraction of authentication information has succeeded ("YES" in step S122), the operation moves on to step S123. If the print data analyzing unit 12 determines that the extraction of authentication information has failed ("NO" in step S122), the operation moves on to step S127.

In step S123, the print data analyzing unit 12 transfers the authentication information extracted in step S121 to the user authentication managing unit 13, and requests authentication.

The operation moves on to step S124 from step S123, and the print data analyzing unit 12 determines whether the authentication has succeeded. If the print data analyzing unit 12 determines that the authentication has succeeded ("YES" in step S124) the operation moves on to step S125. If the print data analyzing unit 12 determines that the authentication has failed ("NO" in step S124), the operation moves on to step S126. When receiving a response to the effect that the authentication has succeeded from the user authentication managing unit 13, the print data analyzing unit 12 determines that the authentication has succeeded. When receiving a response to the effect that the authentication has failed from the user authentication managing unit 13, the print data analyzing unit 12 determines that the authentication has failed.

In step S125, the print data analyzing unit 12 stores the information as a successfully authenticated print job in the print control information storing unit 121 (see FIG. 4).

Meanwhile, in step S126, the print data analyzing unit 12 discards the job.

In step S127, the print data analyzing unit 12 refers to the value of the item "Is Guest Job Allowed?" in the information set in the NVRAM 143 or the like, and determines whether a guest job is allowed. If the print data analyzing unit 12 determines that a guest job is allowed ("YES" in step S127), the operation moves on to step S128. If the print data analyzing unit 12 determines that a guest job is not allowed ("NO" in step S127), the operation moves on to step S130.

In step S128, based on the interface that has received the print job from the host computer 2 or the like via the communication unit 11, and the value of the item "Interfaces to be Regarded as Guests" in the information set in the NVRAM 143, the print data analyzing unit 12 determines whether the interface that has received the print job is an interface to be regarded as a guest. If the print data analyzing unit 12 determines that the interface that has received the print job is an interface to be regarded as a guest ("YES" in step S128), the operation moves on to step S129. If the print data analyzing unit 12 determines that the interface that has received the print job is not an interface to be regarded as a guest ("NO" in step S128), the operation moves on to step S130.

In step S129, the print data analyzing unit 12 stores the information as a guest job in the print control information storing unit 121 (see FIG. 8).

Meanwhile, in step S130, the print data analyzing unit 12 discards the job.

By limiting guest jobs to jobs that have been received via predetermined interfaces as shown in FIG. 29, reception of guest jobs can be limited within a desired range, unlike in the first embodiment and the second embodiment.

Fourth Embodiment

In the third embodiment, whether the interface that has received a job from the host computer 2 or the like is set as an interface to be regarded as a guest in the printer 1 is added to the criteria for determining a guest job according to the first embodiment or the second embodiment. However, whether the job is a guest job may be determined by the result of determination on whether the IP address of the host computer 2 or the like that has received the job via a network is set as an IP address to be regarded as a guest in the printer 1, in addition to the criteria for determining a guest job according to the first embodiment or the second embodiment.

For ease of explanation in the following description, the printer 1 determines a guest job, using the criterion that is "the IP address of a client (the host computer 2, for example) that has received the job is set as an IP address to be regarded as a guest", as well as the criterion according to the first embodiment, which is "the print job does not contain authentication information". This does not limit the scope of the present invention. In the following, the differences between the fourth embodiment and the first, second, or third embodiment are described.

In the following, another example of the information that is set in the NVRAM 143 is described. FIG. 30 shows a third example of the information that is set in the NVRAM 143.

As shown in FIG. 30, the information set in the NVRAM 143 includes items and values, and the items include "Is Printing by a Guest Allowed?" and "Devices to be Regarded as Guests". As the values of the item "Devices to be Regarded as Guests", "No Designation", or IP addresses such as "192.168.○○.XX." are stored.

The manager of the printer 1 can set the value of the item "Devices to be Regarded as Guests" in the NVRAM 143 via the operating unit 18 or the like.

Figure 31:
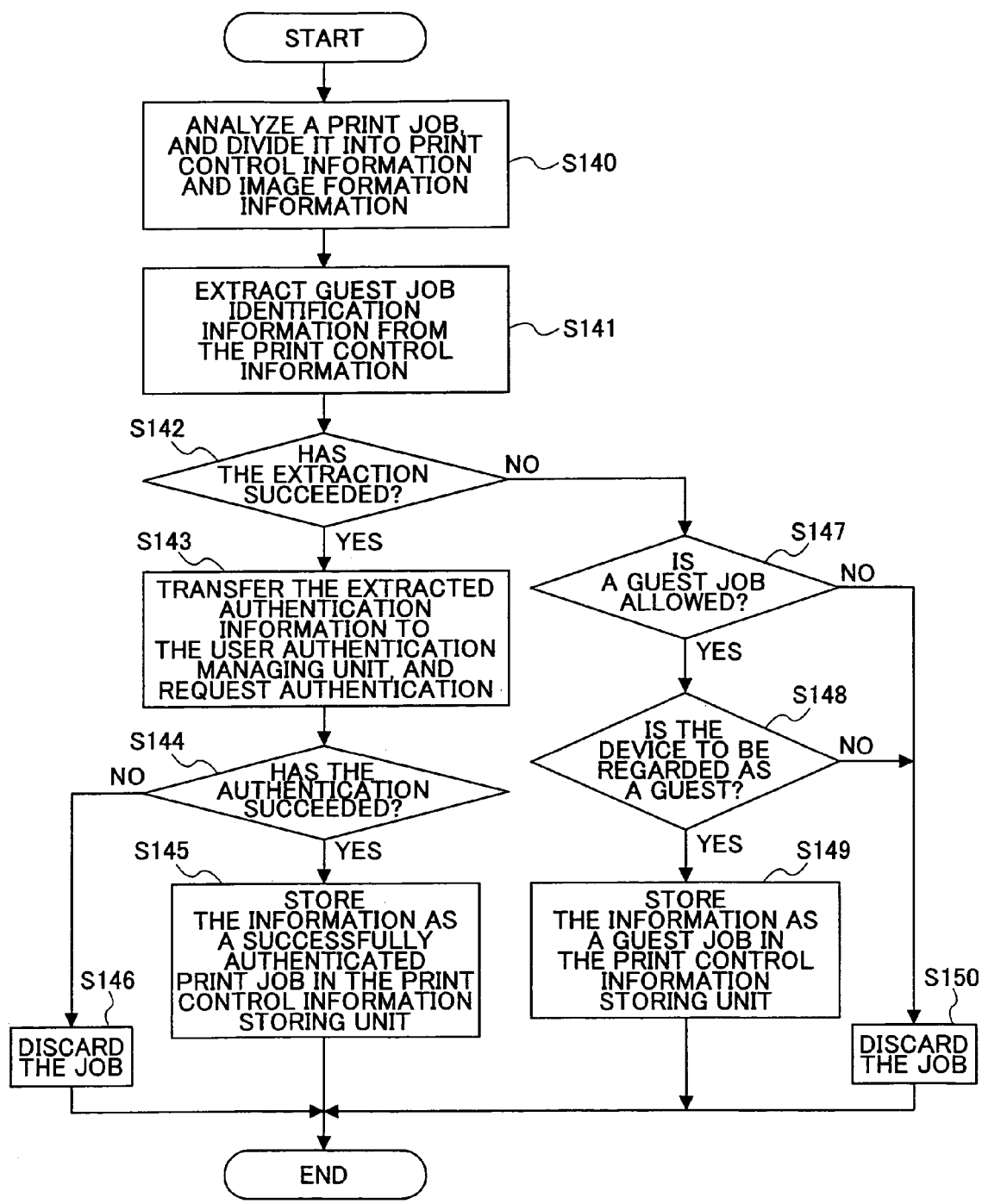
FIG. 31 is a flowchart of a fourth example of a guest job setting operation.

In the following, another example of a guest job setting operation, such as setting a value in the item "Guest Job?" in the print control information storing unit 121, is described. FIG. 31 is a flowchart of a fourth example of a guest job setting operation.

In step S140, the print data analyzing unit 12 analyzes a print job that has been received via the communication unit 11, and divides the print job into the print control information 21 and the image formation information 22.

The operation moves on to step S141 from step S140, and the print data analyzing unit 12 extracts authentication information from the print control information 21.

The operation moves on to step S142 from step S141, and the print data analyzing unit 12 determines whether the extraction of authentication information in step S141 has succeeded. If the print data analyzing unit 12 determines that the extraction of authentication information has succeeded ("YES" in step S142), the operation moves on to step S143. If the print data analyzing unit 12 determines that the extraction of authentication information has failed ("NO" in step S142), the operation moves on to step S147.

In step S143, the print data analyzing unit 12 transfers the authentication information extracted in step S141 to the user authentication managing unit 13, and requests authentication.

The operation moves on to step S144 from step S143, and the print data analyzing unit 12 determines whether the authentication has succeeded. If the print data analyzing unit 12 determines that the authentication has succeeded ("YES" in step S144) the operation moves on to step S145. If the print data analyzing unit 12 determines that the authentication has failed ("NO" in step S144), the operation moves on to step S146. When receiving a response to the effect that the authentication has succeeded from the user authentication managing unit 13, the print data analyzing unit 12 determines that the authentication has succeeded. When receiving a response to the effect that the authentication has failed from the user authentication managing unit 13, the print data analyzing unit 12 determines that the authentication has failed.

In step S145, the print data analyzing unit 12 stores the information as a successfully authenticated print job in the print control information storing unit 121 (see FIG. 4).

Meanwhile, in step S146, the print data analyzing unit 12 discards the job.

In step S147, the print data analyzing unit 12 refers to the value of the item "Is Guest Job Allowed?" in the information set in the NVRAM 143 or the like, and determines whether a guest job is allowed. If the print data analyzing unit 12 determines that a guest job is allowed ("YES" in step S147), the operation moves on to step S148. If the print data analyzing unit 12 determines that a guest job is not allowed ("NO" in step S147), the operation moves on to step S150.

In step S148, based on the IP address acquired via the communication unit 11 when the print job has been received from the host computer 2 or the like over a network, and the value of the item "Devices to be Regarded as Guests" in the information set in the NVRAM 143, the print data analyzing unit 12 determines whether the IP address of the host computer 2 or the like acquired when the print job is received is an IP address to be regarded as a guest. If the print data analyzing unit 12 determines that the IP address of the host computer 2 or the like acquired when the print job is received is an IP address to be regarded as a guest ("YES" in step S148), the operation moves on to step S149. If the print data analyzing unit 12 determines that the IP address of the host computer 2 or the like acquired when the print job is received is not an IP address to be regarded as a guest ("NO" in step S148), the operation moves on to step S150.

In step S149, the print data analyzing unit 12 stores the information as a guest job in the print control information storing unit 121 (see FIG. 8).

Meanwhile, in step S150, the print data analyzing unit 12 discards the job.

By limiting guest jobs to jobs that have been received from the predetermined host computers 2 or the like as shown in FIG. 31, reception of guest jobs can be limited within a desired range, unlike in the first embodiment and the second embodiment.

Fifth Embodiment

In the fourth embodiment, whether the IP address of the host computer 2 or the like acquired when the job is received over a network is set as an IP address to be regarded as a guest in the printer 1 is added to the criteria for determining a guest job according to the first embodiment or the second embodiment. However, whether the job is a guest job may be determined by the result of determination on whether the PDL identifier contained in the image formation information 22 is set as a PDL identifier (or a printer language) to be regarded as a guest in the printer 1, in addition to the criteria for determining a guest job according to the first embodiment or the second embodiment.

For ease of explanation in the following description, the printer 1 determines a guest job, using the criterion that is "the PDL identifier contained in the image formation information 22 is set as a PDL identifier to be regarded as a guest in the printer 1", as well as the criterion according to the first embodiment, which is "the print job does not contain authentication information". However, this does not limit the scope of the present invention. In the following, the differences between the fifth embodiment and the first, second, third, or fourth embodiment are described.

In the following, another example of the information that is set in the NVRAM 143 is described. FIG. 32 shows a fourth example of the information that is set in the NVRAM 143.

As shown in FIG. 32, the information set in the NVRAM 143 includes items and values, and the items include "Is Printing by a Guest Allowed?" and "Printer Languages to be Regarded as Guests". As the values of the item "Printer Languages to be Regarded as Guests", "No Designation", or printer languages (PEL identifiers) such as "PCL" and "RPDL" are stored.

The manager of the printer 1 can set the value of the item "Printer Languages to be Regarded as Guests" in the NVRAM 143 via the operating unit 18 or the like.

Figure 33:
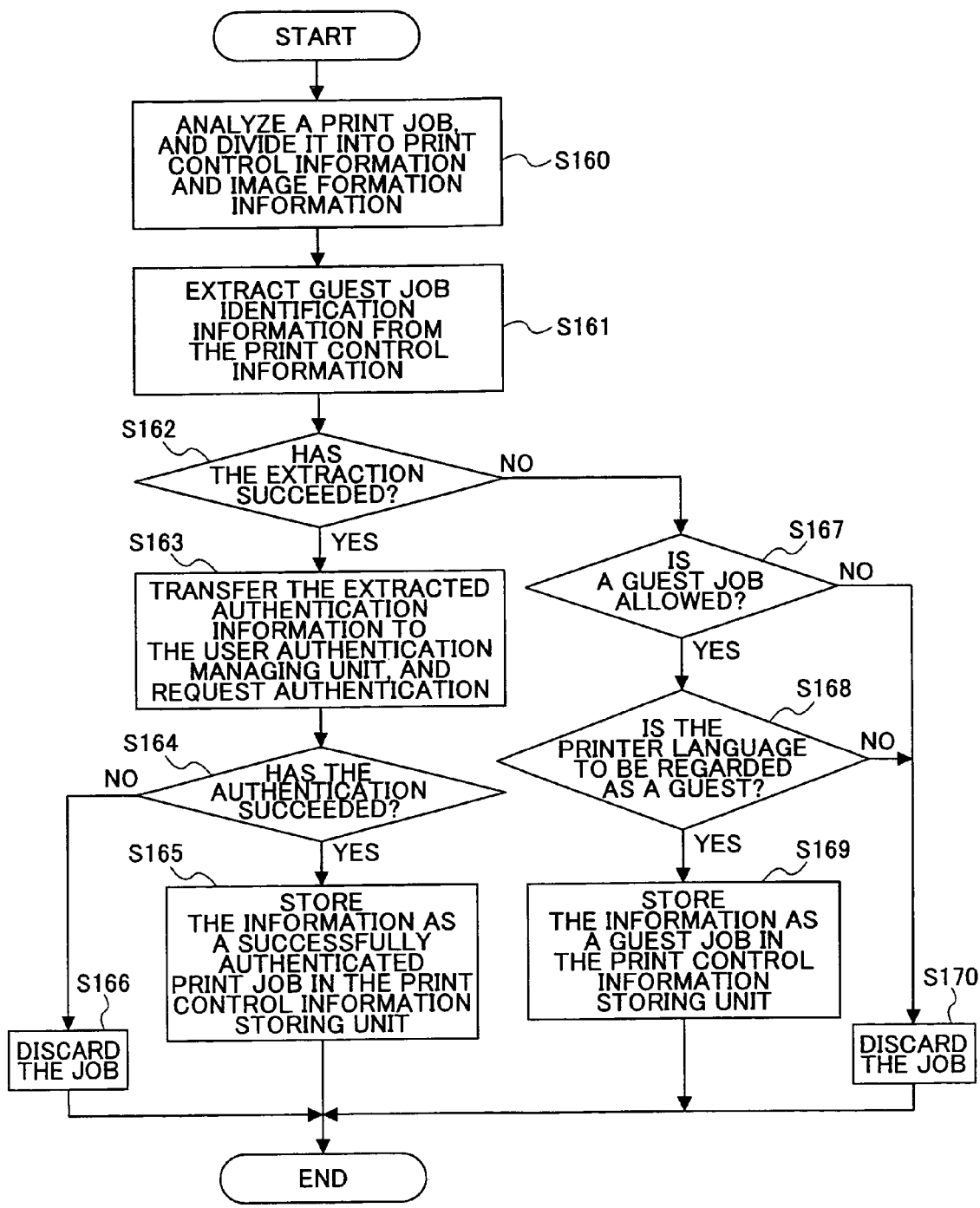
FIG. 33 is a flowchart of a fifth embodiment of a guest job setting operation.

In the following, another example of a guest job setting operation, such as setting a value in the item "Guest Job?" in the print control information storing unit 121, is described. FIG. 33 is a flowchart of a fifth example of a guest job setting operation.

In step S160, the print data analyzing unit 12 analyzes a print job that has been received via the communication unit 11, and divides the print job into the print control information 21 and the image formation information 22.

The operation moves on to step S161 from step S160, and the print data analyzing unit 12 extracts authentication information from the print control information 21.

The operation moves on to step S162 from step S161, and the print data analyzing unit 12 determines whether the extraction of authentication information in step S161 has succeeded. If the print data analyzing unit 12 determines that the extraction of authentication information has succeeded ("YES" in step S162), the operation moves on to step S163. If the print data analyzing unit 12 determines that the extraction of authentication information has failed ("NO" in step S162), the operation moves on to step S167.

In step S163, the print data analyzing unit 12 transfers the authentication information extracted in step S161 to the user authentication managing unit 13, and requests authentication.

The operation moves on to step S164 from step S163, and the print data analyzing unit 12 determines whether the authentication has succeeded. If the print data analyzing unit 12 determines that the authentication has succeeded ("YES" in step S164) the operation moves on to step S165. If the print data analyzing unit 12 determines that the authentication has failed ("NO" in step S164), the operation moves on to step S166. When receiving a response to the effect that the authentication has succeeded from the user authentication managing unit 13, the print data analyzing unit 12 determines that the authentication has succeeded. When receiving a response to the effect that the authentication has failed from the user authentication managing unit 13, the print data analyzing unit 12 determines that the authentication has failed.

In step S165, the print data analyzing unit 12 stores the information as a successfully authenticated print job in the print control information storing unit 121 (see FIG. 4).

Meanwhile, in step S166, the print data analyzing unit 12 discards the job.

In step S167, the print data analyzing unit 12 refers to the value of the item "Is Guest Job Allowed?" in the information set in the NVRAM 143 or the like, and determines whether a guest job is allowed. If the print data analyzing unit 12 determines that a guest job is allowed ("YES" in step S167), the operation moves on to step S168. If the print data analyzing unit 12 determines that a guest job is not allowed ("NO" in step S167), the operation moves on to step S170.

In step S168, based on the PDL identifier contained in the image formation information 22 and the value of the item "Printer Languages to be Regarded as Guests" in the information set in the NVRAM 143, the print data analyzing unit 12 determines whether the PDL identifier contained in the image formation information 22 is a printer language to be regarded as a guest. If the print data analyzing unit 12 determines that the PDL identifier contained in the image formation information 22 is a printer language to be regarded as a guest ("YES" in step S168), the operation moves on to step S169. If the print data analyzing unit 12 determines that the PDL identifier contained in the image formation information 22 is not a printer language to be regarded as a guest ("NO" in step S168), the operation moves on to step S170.

In step S169, the print data analyzing unit 12 stores the information as a guest job in the print control information storing unit 121 (see FIG. 8).

Meanwhile, in step S170, the print data analyzing unit 12 discards the job.

By limiting guest jobs to jobs in predetermined printer languages as shown in FIG. 33, reception of guest jobs can be limited within a desired range, unlike in the first embodiment and the second embodiment.

As described so far, in accordance with the present invention, a user restricting operation and an account managing operation can be efficiently performed for various types of print jobs.

It should be noted that the present invention is not limited to the embodiments specifically disclosed above, but other variations and modifications may be made without departing from the scope of the present invention.

This patent application is based on Japanese Priority Patent Application No. 2004-196801, filed on Jul. 2, 2004, the entire contents of which are hereby incorporated by reference.

What is claimed is:

1. A printer device, which can handle a plurality of printer control languages, comprising:
   an authenticating unit that performs user authentication;
   a determining unit that determines whether a print job is to be handled as a guest job that has limited authority to print and accumulate documents, based on predetermined information including stored information settable by an operator indicating whether a guest job is allowed to be executed; and
   an executing unit that performs document printing and accumulation, based on the result of the determination by the determining unit,
   wherein the determining unit determines the print job to be the guest job, not only based on the predetermined information, but also because the print job is written in a particular printer control language among the plurality of printer control languages.

2. A printer device, comprising:
   an authenticating unit that performs user authentication;
   a determining unit that determines whether a print job is to be handled as a guest job that has limited authority to print and accumulate documents, based on predetermined information including stored information settable by an operator indicating whether a guest job is allowed to be executed;
   an executing unit that performs document printing and accumulation, based on the result of the determination by the determining unit; and
   a plurality of interfaces,
   wherein the determining unit determines the print job to be the guest job, not only based on the predetermined information, but also because the print job is received via a particular interface among the plurality of interfaces.

3. A printer device, which is connected to a plurality of terminals via a network, comprising:
   an authenticating unit that performs user authentication;
   a determining unit that determines whether a print job is to be handled as a guest job that has limited authority to print and accumulate documents, based on predetermined information including stored information settable by an operator indicating whether a guest job is allowed to be executed; and
   an executing unit that performs document printing and accumulation, based on the result of the determination by the determining unit,
   wherein the determining unit determines the print job to be the guest job, not only based on the predetermined information, but also because the print job is received from a particular terminal among the plurality of terminals.

4. A printer device, comprising:
   an authenticating unit that performs user authentication;
   a determining unit that determines whether a print job is to be handled as a guest job that has limited authority to print and accumulate documents, based on predetermined information including stored information settable by an operator indicating whether a guest job is allowed to be executed;
   an executing unit that performs document printing and accumulation, based on the result of the determination by the determining unit; and
   a document accumulating unit that accumulates documents relating to the print job, wherein, once accumulated in the document accumulating unit, the documents relating to the guest job are printed in accordance with a request from the user authenticated by the authenticating unit.

5. The printer device as claimed in claim 4, wherein, when the user authenticated by the authenticating unit has the authority to manage the printer device, an instruction can be issued to collectively print the documents accumulated in the document accumulating unit.

6. A printing method, which can handle a plurality of printer control languages, and that is utilized by a printer device comprising an authenticating unit that authenticates a user, the method comprising:

determining whether a print job is to be regarded as a guest job that has limited authority to print and accumulate documents, based on predetermined information including stored information settable by an operator indicating whether a guest job is allowed to be executed; and performing document printing and accumulation, based on the result of the determination performed in the step of determining the print job;

wherein the determining determines the print job to be the guest job, not only based on the predetermined information, but also because the print job is written in a particular printer control language among the plurality of printer control languages.

7. A printing method, that is utilized by a printer device comprising an authenticating unit that authenticates a user and a plurality of interfaces, the method comprising:

determining whether a print job is to be regarded as a guest job that has limited authority to print and accumulate documents, based on predetermined information including stored information settable by an operator indicating whether a guest job is allowed to be executed; and performing document printing and accumulation, based on the result of the determination performed in the step of determining the print job;

wherein the determining unit determines the print job to be the guest job, not only based on the predetermined information, but also because the print job is received via a particular interface among the plurality of interfaces.

8. A printing method that is utilized by a printer device comprising an authenticating unit that authenticates a user, and which is connected to a plurality of terminals via a network, the method comprising:

determining whether a print job is to be regarded as a guest job that has limited authority to print and accumulate documents, based on predetermined information including stored information settable by an operator indicating whether a guest job is allowed to be executed; and performing document printing and accumulation, based on the result of the determination performed in the step of determining the print job;

wherein the determining unit determines the print job to be the guest job, not only based on the predetermined information, but also because the print job is received from a particular terminal among the plurality of terminals.

* * * * *